United States Patent [19]

Kasagami et al.

[11] Patent Number: 5,353,386
[45] Date of Patent: Oct. 4, 1994

[54] APPARATUS FOR CONTROLLING INDUSTRIAL ROBOT SYSTEM TO PERFORM COORDINATED OPERATION USING TEACHING PLAYBACK METHOD AND METHOD THEREOF

[75] Inventors: Fumio Kasagami, Ikoma; Seisuke Kugumiya, Kitsuki, both of Japan

[73] Assignee: Daihen Corporation, Osaka, Japan

[21] Appl. No.: 909,159

[22] Filed: Jul. 6, 1992

[30] Foreign Application Priority Data

Jul. 6, 1991 [JP] Japan .................. 3-166018

[51] Int. Cl.$^5$ .............................. G06F 15/46
[52] U.S. Cl. .................... 395/82; 395/80; 395/97
[58] Field of Search ................. 395/80, 81, 82, 83, 395/84, 97

[56] References Cited

U.S. PATENT DOCUMENTS

| | | | |
|---|---|---|---|
| 4,146,924 | 3/1979 | Birk et al. | 395/82 |
| 4,868,473 | 9/1989 | Kato | 395/82 |
| 4,891,765 | 1/1990 | Hatori et al. | |
| 4,894,901 | 1/1990 | Soderberg | |
| 4,947,314 | 8/1990 | Sumida | 395/82 |
| 4,954,762 | 9/1990 | Miyake et al. | 395/82 |
| 5,019,762 | 5/1991 | Kato | 395/82 |
| 5,020,001 | 5/1991 | Yamamoto et al. | 395/82 |
| 5,025,390 | 6/1991 | Daggett | 395/82 |
| 5,046,021 | 9/1991 | Salvagnini | 395/82 |
| 5,093,607 | 3/1992 | Fujita et al. | 395/82 |
| 5,198,737 | 3/1993 | Harima et al. | 395/82 |
| 5,214,748 | 5/1993 | Wakayama et al. | 395/82 |

FOREIGN PATENT DOCUMENTS

| | | |
|---|---|---|
| 3830866 | 3/1990 | Fed. Rep. of Germany . |
| 62-114009 | 5/1987 | Japan . |
| 63-216105 | 9/1988 | Japan . |
| 63-295193 | 12/1988 | Japan . |
| 63-313207 | 12/1988 | Japan . |

OTHER PUBLICATIONS

Ken Fernandez, et al., "A Generalized Method for Automatic Downhand and Wirefeed Control of a Welding Robot and Positioner", NASA Technical Paper 2807, pp. 1–48, National Aeronatics and Space Administration, Scientific and Technical Info. Division, Feb. '88.

(List continued on next page.)

*Primary Examiner*—Michael R. Fleming
*Assistant Examiner*—Tariq R. Hafiz
*Attorney, Agent, or Firm*—Scully, Scott, Murphy & Presser

[57] ABSTRACT

In an apparatus for controlling an industrial robot system comprising a workpiece handling apparatus having first revolute joints for moving a workpiece, and a tool moving apparatus having second revolute joints for moving a tool so as to move the workpiece and the tool on a predetermined trajectory between two adjacent teaching points, there are calculated a position and an attitude of a predetermined coordinate system of a predetermined workpiece attachment reference point based on a coordinate system of a baseplane of said workpiece handling apparatus, and a position and an attitude of a predetermined coordinate system of a predetermined tool attachment reference point based on a coordinate system of a baseplane of said tool handling apparatus, from inputted teaching data. Further, there are calculated joint variables of the first and second revolute joints for moving tile workpiece and the tool on the trajectory, from the calculated data. Finally, the first and second revolute joints are simultaneously driven in accordance with the calculated joint variables thereof.

14 Claims, 27 Drawing Sheets

OTHER PUBLICATIONS

Cecil O. Alford, et al., "Cordinated Control of Two Robot Arms", Proceedings of IEEE International Conference on Robotics, Atlanta, Ga., pp. 468–473, Mar. 13–15, 1984.

Shaheen Ahmad, et al., "Coordinated Motion Control of Multiple Robotic Devices for Welding and Redundancy Coordination through Constrained Optimization in Cartesian Space", Proceedings of EIII International Conf. on Robotics and Automation, Phila., Pa., pp. 963–968 Apr. 24–29, 1988.

Jian M. Tao, et al., "Compliant Coordination Control of Two Moving Industrial Robots", IEEE transactions on Robotics and Automation vol. 6, No. 3., pp. 322–330, Jun. 1990.

Richard P. Paul, "Robot Manipulators: Mathematics, Programming, and Control, the Computer Control of Robot Manipulators", pp. 50–59, The Massachusetts Institute of Technology Press, 1981.

John J. Craig, "Introduction to Robotics Mechanics & Control", pp. 1–14 pp. 97–99, Addition–Wesley Publishing Company 1986.

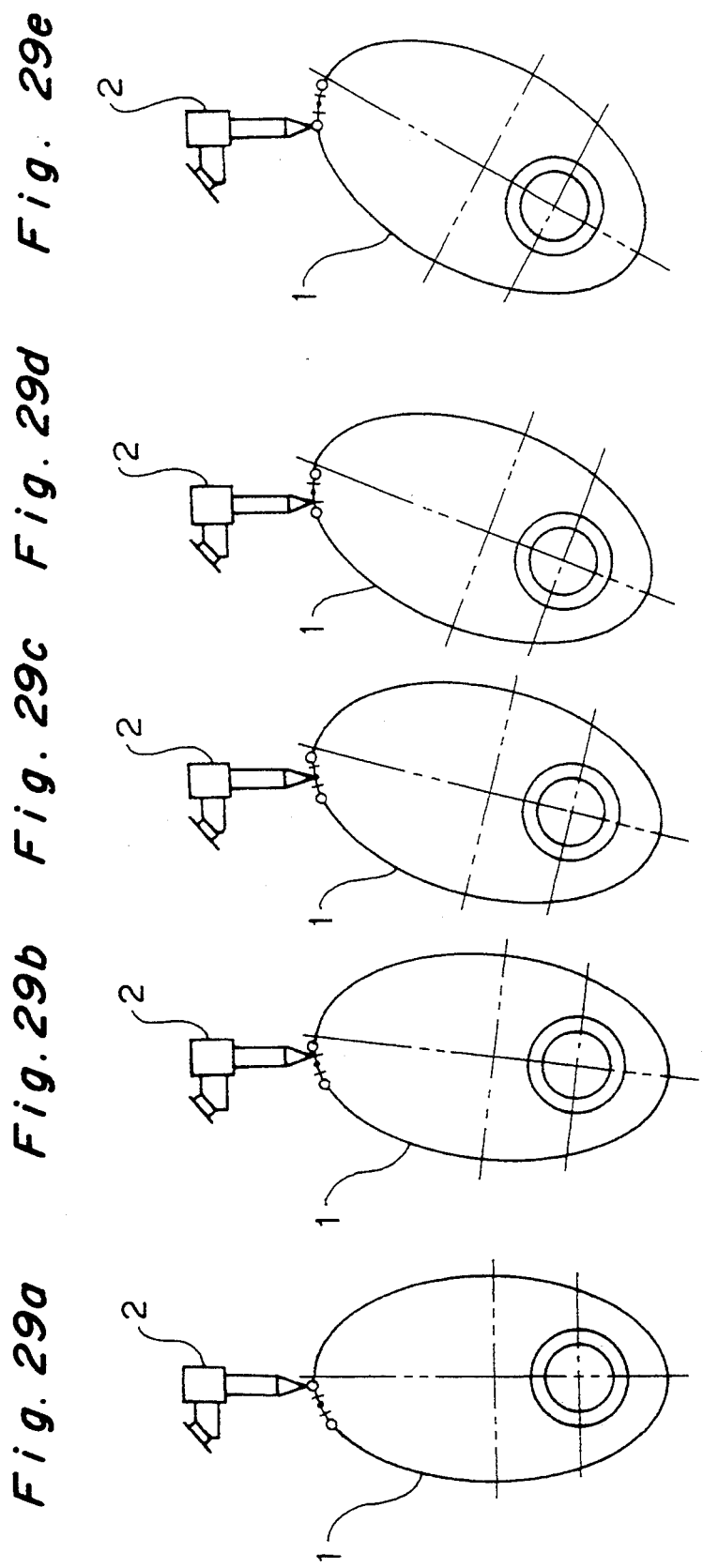

APPARATUS FOR CONTROLLING INDUSTRIAL ROBOT SYSTEM TO PERFORM COORDINATED OPERATION USING TEACHING PLAYBACK METHOD AND METHOD THEREOF

BACKGROUND OF THE INVENTION

1. Field of the Invention

The present invention relates to an apparatus for controlling an industrial robot system and a method thereof, more particularly, to an apparatus for controlling an industrial robot system to perform a coordinated operation using a teaching playback method, and a method thereof.

2. Description of the Related Art

Conventionally, in a playback operation for performing a coordinated operation to a perform a task for simultaneously operating a tool moving apparatus for moving a tool and a workpiece handling apparatus for holding and moving a workpiece, it is difficult to maintain a pretaught constant relative speed of an end of a tool to a workpiece. This reason will be described with reference to conventional three methods, for example, in the case of moving a tool 2 of a welding torch from a point P1 to another point P2 on an elliptic trajectory using a straight line approximation method gradually changing an attitude of a workpiece 1, as shown in FIGS. 28a and 28b.

In the first conventional method, data of a large number of teaching points, into which the tool 2 is sequentially moved respectively as shown in FIGS. 29a to 29e, are stored as a task program in a storage unit, and then, these data are played back. In the playback operation, a starting timing and an end timing of the tool 2 of the welding torch are synchronous with those of workpiece 1. However, the tool moving apparatus and the workpiece handling apparatus have control units different from each other, respectively. Since these control units separately perform a calculation process for controlling operations thereof in this case, the relative speed between the tool 2 and the workpiece 1 during the operation always changes. Therefore, for example, when this method is applied to a welding process, the tool moving apparatus and the workpiece handling apparatus can not perform a coordinated operation with accuracy, and the welding process can not be performed so as to moving the welding torch along a desirable predetermined seem, resulting in considerably lowering quality of the welding.

As the second conventional method, a control method is suggested in the Japanese patent laid-open publication No. 63-216105, wherein control values of the tool moving apparatus and the workpiece handling apparatus are calculated, a relative position between a tool and a workpiece is calculated by detecting respective positions thereof during an operation, and then, respective control values are corrected according to the calculated relative position so that the tool and the workpiece are located in a desirable relative position. However, the tool moving apparatus and the workpiece handling apparatus have control units different from each other in a manner similar to that of the first conventional method, and these control units separately perform a calculation process for controlling operations thereof. Therefore, the relative speed between the tool and the workpiece during the operation always changes.

Further, as the third conventional method, there is suggested a method of correcting a detection value of a sensor after detecting a relative position of a tool to a workpiece using the sensor. In a conventional apparatus using this method, in order to perform a coordinated operation with high accuracy so as to move the tool and the workpiece in a predetermined constant relative speed, it is necessary to perform a high speed communication for exchanging information between control units of the workpiece apparatus and the tool moving apparatus. However, in the conventional industrial robot system, it is extremely difficult to obtain a high speed response in practice.

SUMMARY OF THE INVENTION

An object of the present invention is therefore to provide an apparatus for controlling an industrial robot system capable of performing a coordinated operation so as to move a workpiece and a tool in a substantially predetermined constant relative speed therebetween without communicating between control units of a workpiece handling apparatus and a tool moving apparatus.

Another object of the present invention is to provide a method of controlling an industrial robot system capable of performing a coordinated operation so as to move a workpiece and a tool in a substantially predetermined constant relative speed therebetween without communicating between control units of a workpiece handling apparatus and a tool moving apparatus.

In order to achieve the aforementioned objective, according to one aspect of the present invention, there is provided an apparatus for controlling an industrial robot system comprising a workpiece handling apparatus having first revolute joint means for moving a workpiece, and a tool moving apparatus having second revolute joint means for moving a tool so as to move said workpiece and said tool on a predetermined trajectory between two adjacent teaching points, comprising:

(a) first calculation means for calculating a position and an attitude of said workpiece based on a predetermined reference coordinate system, and a position and an attitude of said tool based on a workpiece reference point predetermined in said workpiece at a plurality of interpolation points obtained by dividing said trajectory between said two adjacent teaching points, using a predetermined interpolation method, from teaching data at said two adjacent teaching points each teaching data being composed of a position and an attitude of said tool based on said workpiece reference point, a position and an attitude of said workpiece based on said predetermined reference coordinate system, and a translational speed of a tool reference point predetermined in said tool based on said workpiece reference point upon a translational movement of said tool on said trajectory between said two adjacent teaching points;

(b) second calculation means for calculating a position and an attitude of a predetermined coordinate system of a predetermined workpiece attachment reference point based on a coordinate system of a baseplane of said workpiece handling apparatus, and a position and an attitude of a predetermined coordinate system of a predetermined tool attachment reference point based on a coordinate system of a baseplane of said tool handling apparatus, using a predetermined coordinate transformation, from the position and attitude of said workpiece based on said reference coordinate system, and the position and attitude of said tool based on said workpiece reference point which are calculated by said first calculation means;

(c) third calculation means for calculating joint variables of said first and second revolute joint means for moving said workpiece and said tool on said trajectory, using a predetermined inverse transformation, from the position and attitude of said coordinate system of said workpiece attachment reference point and the position and attitude of said coordinate system of said tool attachment reference point which are calculated by said second calculation means; and (d) driving means for simultaneously driving said first and second revolute joint means in accordance with said joint variables of said first and second revolute joint means calculated by said third calculation means.

In the above-mentioned apparatus, wherein said driving means comprises:

(a) signal generation means for generating a synchronizing signal having a predetermined period;

(b) synchronously outputting means for simultaneously storing and outputting said joint variables of said first and second revolute joint means calculated by said third calculation means in synchronous with said synchronizing signal generated by said signal generation means; and (c) driving control means for simultaneously driving said first and second revolute joint means in accordance to said joint variables of said first and second revolute joint means outputted from said synchronously outputting means.

In the above-mentioned apparatus, wherein said synchronously outputting means is preferably either one of a latch circuit and a processing unit.

In the above-mentioned apparatus, wherein said reference coordinate system is preferably either one of a predetermined coordinate system of a baseplane of said workpiece and a predetermined world coordinate system.

According to another aspect of the present invention, there is provided a method of controlling an industrial robot system comprising a workpiece handling apparatus having first revolute joint means for moving a workpiece, and a tool moving apparatus having second revolute joint means for moving a tool so as to move said workpiece and said tool on a predetermined trajectory between two adjacent teaching points, including the following steps of:

(a) calculating a position and an attitude of said workpiece based on a predetermined reference coordinate system, and a position and an attitude of said tool based on a workpiece reference point predetermined in said workpiece at a plurality of interpolation points obtained by dividing said trajectory between said two adjacent teaching points, using a predetermined interpolation method, from teaching data at said two adjacent teaching points each teaching data being composed of a position and an attitude of said tool based on said workpiece reference point, a position and an attitude of said workpiece based on said predetermined reference coordinate system, and a translational speed of a tool reference point predetermined in said tool based on said workpiece reference point upon a translational movement of said tool on said trajectory between said two adjacent teaching points;

(b) calculating a position and an attitude of a predetermined coordinate system of a predetermined workpiece attachment reference point based on a coordinate system of a baseplane of said workpiece handling apparatus, and a position and an attitude of a predetermined coordinate system of a predetermined tool attachment reference point based on a coordinate system of a baseplane of said tool handling apparatus, using a predetermined coordinate transformation, from the position and attitude of said workpiece based on said reference coordinate system, and the position and attitude of said tool based on said workpiece reference point which are calculated at said calculating step (a);

(c) calculating joint variables of said first and second revolute joint means for moving said workpiece and said tool on said trajectory, using a predetermined inverse transformation, from the position and attitude of said coordinate system of said workpiece attachment reference point and the position and attitude of said coordinate system of said tool attachment reference point which are calculated at said calculating step (b); and (d) simultaneously driving said first and second revolute joint means in accordance with said joint variables of said first and second revolute joint means calculated at said calculating step (c).

In the above-mentioned method, wherein said driving step (d) includes:

(e) generating a synchronizing signal having a predetermined period;

(f) simultaneously storing and outputting said joint variables of said first and second revolute joint means calculated at said calculating step (c) in synchronous with said generated synchronizing signal; and (g) simultaneously driving said first and second revolute joint means in accordance to said outputted joint variables of said first and second revolute joint means.

In the above-mentioned method, wherein said reference coordinate system is preferably either one of a predetermined world coordinate system and a predetermined coordinate system of a baseplane of said workpiece.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 29a to 29e are front views showing an operation for moving a tool from a point P1 to another point P2 on an elliptic trajectory using a straight line approximation method in the case shown in FIG. 28.

DETAILED DESCRIPTION OF THE PREFERRED EMBODIMENTS

Figure 1:
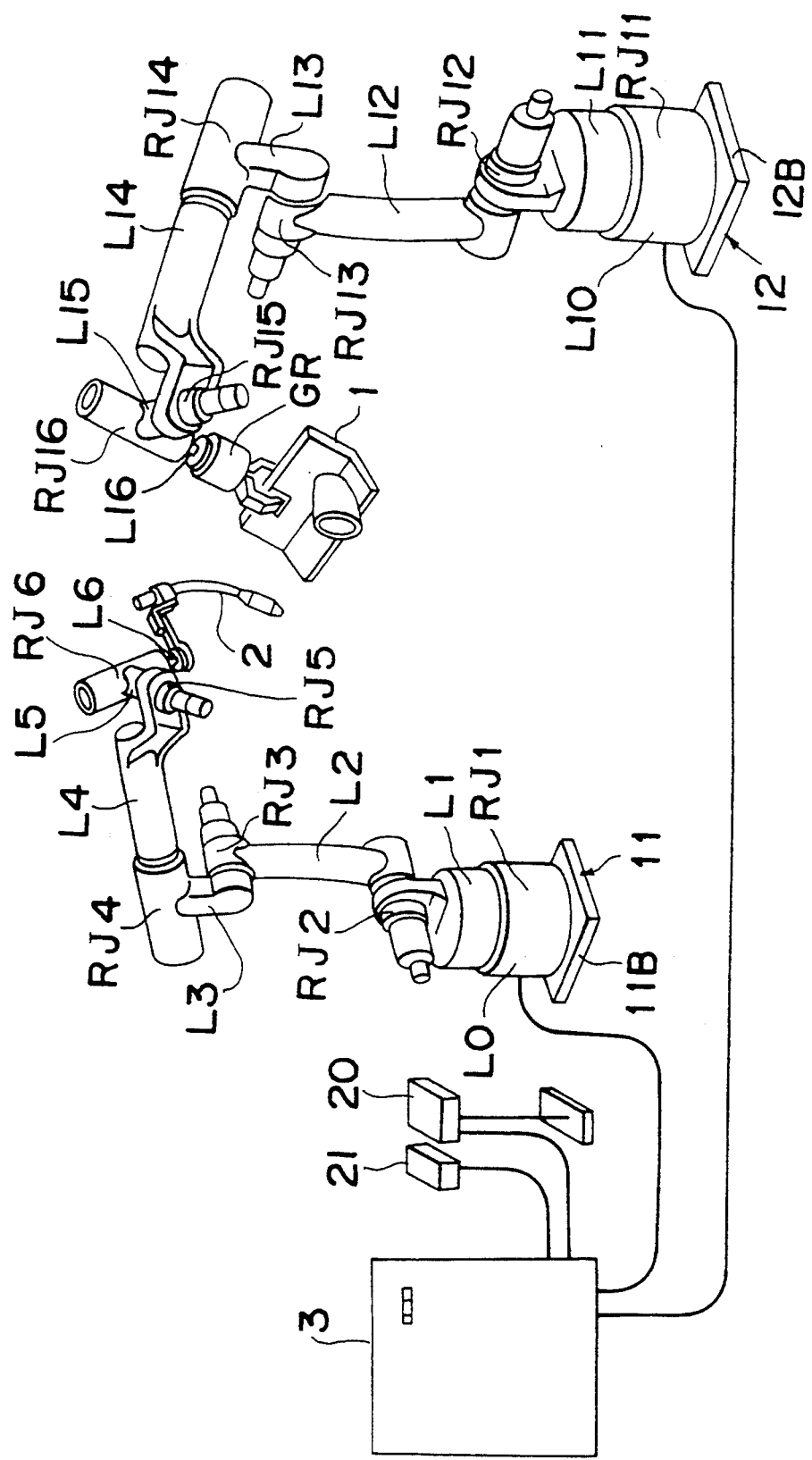
FIG. 1 is a perspective view showing the whole composition of an industrial robot system of a preferred embodiment according to the present invention.

An industrial robot system of a preferred embodiment according to the present invention will be described below in an order of the following items with reference to the attached drawings.

(1) Composition of Industrial robot system
(2) Composition of Control unit
(3) Principle of Control method
   (3-1) Teaching operation
   (3-2) Playback operation
(2) Process of Control unit
   (4-1) Main routine
   (4-2) Manual operation process
   (4-3) Teaching data calculation process
   (4-4) Playback operation process
   (4-5) Increment calculation process
   (4-6) Motor control process
(5) Modifications In the present preferred embodiment, "a position and an attitude of a coordinate system set in a workpiece reference point" is referred to as "a position and an attitude of a workpiece reference point", wherein the coordinate system set in the workpiece reference point is provided for representing a position and an attitude of a workpiece 1. Therefore, "the position and attitude of the workpiece reference point" represents a position of the workpiece 1 and a position and an attitude of a main body of the workpiece 1. Terms with respect to a tool 2 are used in a manner similar to that of above. Such a phrase as "based on a coordinate system of a baseplane" is referred to as "based on a baseplane".

(1) Composition of Industrial Robot System

FIG. 1 shows the whole of the industrial robot system of the present preferred embodiment using the teaching playback method.

Referring to FIG. 1, the industrial robot system comprises a tool moving apparatus 11 of a manipulator with six degrees of freedom of motion for moving the tool 2 of a welding torch, and a workpiece handling apparatus 12 of a manipulator or a positioner with six degrees of freedom of motion for holding and moving the workpiece 1 to be processed, the workpiece handling apparatus 12 having a griper GR for holding the workpiece 1. In particular, the industrial robot system is characterized in further comprising only one control unit 3 for controlling the apparatuses 11 and 12. To the control unit 3, there is connected a teaching box 20 for inputting data by an operator to generate a task program by operating the two apparatuses 11 and 12 in a teaching operation, and an operation box 21 for being manually operated by the operator to switch over between the teaching operation and an automatic playback operation and also to output a start signal in the automatic playback operation.

Figure 6:
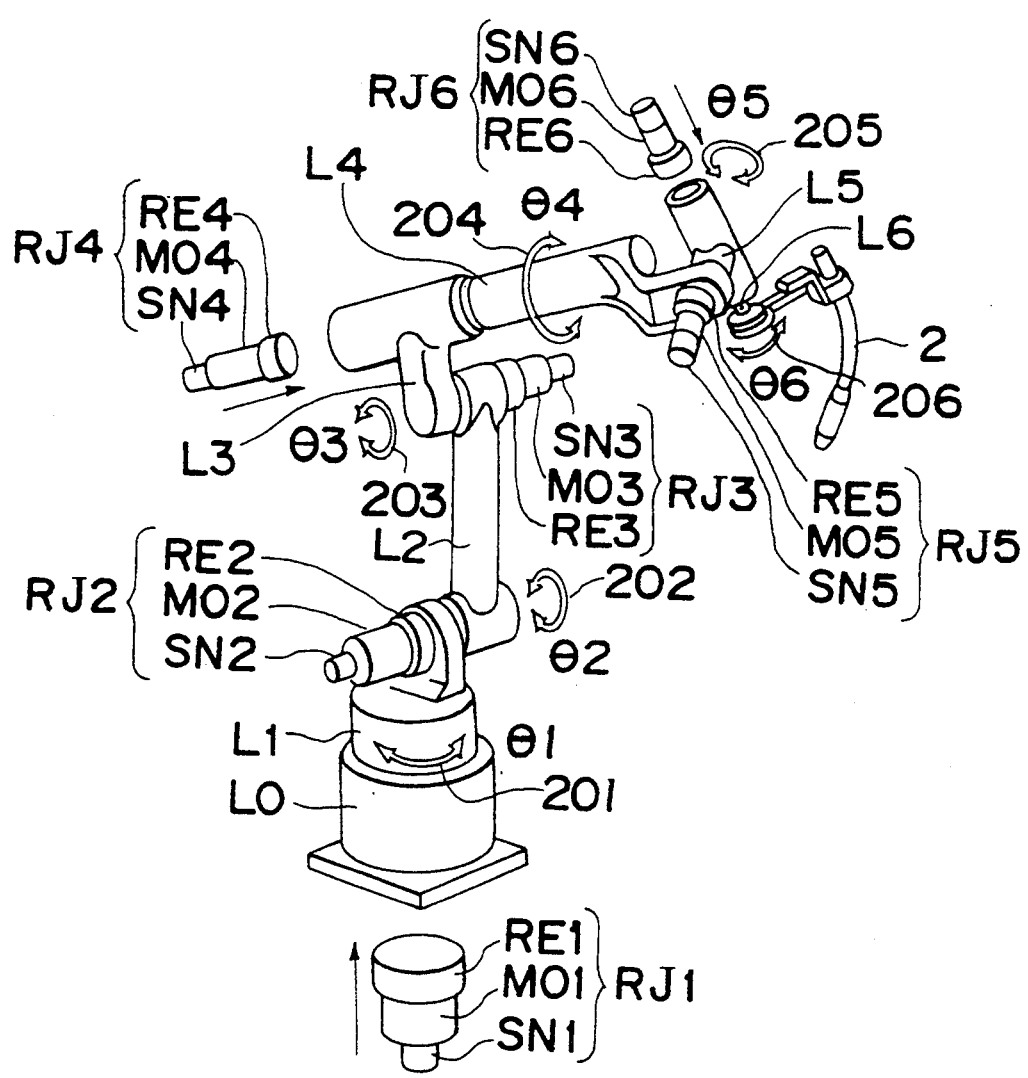
FIG. 6 is a perspective view showing a composition of a tool moving apparatus shown in FIG. 1.

Further, as shown in FIG. 1, the tool moving apparatus 11 is arranged on a base 11B, and comprises six rotatable revolute joints RJ1 to RJ6 (a revolute joint is referred to as a joint hereinafter), and seven links L0 to L6 for connecting the adjacent joints, respectively. In the tool moving apparatus 11, the base 11B is connected through the 0-th link L0 to the first joint RJ1, which is connected through the first link L1 to the second joint RJ2, which is connected through the second L2 to the third joint RJ3. The joint RJ3 is connected through the third link L3 to the fourth joint RJ4, which is connected through the fourth link L4 to the fifth joint RJ5, which is connected through the fifth link L5 to the sixth joint RJ6. The sixth joint RJ6 is connected through the sixth link L6 to the tool 2. As shown in FIG. 6, each of the joints RJk (k=1, 2, ..., 6) comprises a motor MOk of a servo motor, a rotation angle of which is controlled by the control unit 3, a speed reducer REk for reducing the rotation speed of the motor MOk with a predetermined speed reduction ratio $\lambda k$, and a sensor SNk for detecting the position of the rotation shaft after reducing the speed of the motor MOk, wherein the shafts thereof are rotated in directions indicated by arrows 201 to 206, respectively.

In the tool moving apparatus 11, as shown in FIGS. 8 to 12, the following three-dimensional coordinate systems are set:

(a) seven coordinate systems (Xk, Yk, Zk) (k=0, 1, 2, ..., 6) set with centers OT0, OT1, OT2, OT3, OT4, OT5 and OT6 of respective joint axes Z0 to Z6 in respective joints RJ1 to RJ6 located at the ends of respective links L0 to L5 and an end of the link L6;

(b) a reference coordinate system (Xbase, Ybase, Zbase) set with a center OTb in the base 11B; and (c) a tool coordinate system (Xt, Yt, Zt) set with a center OTT at the end of the tool 2.

The links L0 and L1 are arranged so as to be rotated around the joint axis Z0 of the joint RJ1, and have the same center axes Zbase and Z0 as each other. A joint variable $\theta 1$ is defined as an angle between the axis X0 and an axis Xbase' parallel to the axis Xbase on the X0-Y0 plane and extending from the center OT0. Also, a common normal distance a0t of the link L0 is set to zero, and a distance d1t between the links L0 and L1 is set as a distance between respective centers OTb and OT0. Further, a common normal distance of the link L1 is denoted by a1t, and a distance between the links L1 and L2 is denoted by d1t. The link L2 is arranged so as to be rotated around the joint axis Z1 of the joint RJ2, and a joint variable $\theta 2$ is defined as an angle between the axis X1 and an axis X0' parallel to the axis X0 on the X1-Y1 plane and extending from the center OT1. Similarly, the links L3 to L6 are arranged so as to be rotated around the joint axes Z2 to Z5 of the joints RJ3 to RJ6, respectively, and the joint variables $\theta 3$ to $\theta 6$ are defined similarly. Furthermore, common normal distances of respective links L2 to L6 are denoted by a2t to a6t, respectively, and the distances between the links thereof are denoted by d2t to d6t, respectively.

Table 1 shows parameters of the links L0 to L6 of the tool moving apparatus 11. In Table 1, the joint variable $\theta n$ represents a rotation angle of the n-th link Ln, and the common normal distance ant corresponds to a length of the n-th link Ln. The distance dnt between the links corresponds to a distance between the (n−1)-th link Ln-1 and the n-th link Ln, and the twist angle ant is an angle between the joint axes corresponding to an angle between the (n-1)-th link Ln-1 and the n-th link Ln.

Coordinate transformations in respective links Ln (n=0, 1, 2, ..., 6) of the tool moving apparatus 11 are represented by homogeneous transformation matrices Ant of the following equation (1), using the link parameters in a representation of the Denavit-Hartenberg which is known to those skilled in the art:

$$Ant(j) = Rot(Zj-1, \theta n) \cdot Trans(0,0,dnt) \cdot Trans(ant,0,0) \cdot Rot(Xj-1, ant) \quad (1)$$

$$= \begin{bmatrix} \cos\theta n & -\sin\theta n & 0 & 0 \\ \sin\theta n & \cos\theta n & 0 & 0 \\ 0 & 0 & 1 & 0 \\ 0 & 0 & 0 & 1 \end{bmatrix} \cdot \begin{bmatrix} 1 & 0 & 0 & ant \\ 0 & 1 & 0 & 0 \\ 0 & 0 & 1 & dnt \\ 0 & 0 & 0 & 1 \end{bmatrix} \cdot$$

-continued $$\begin{bmatrix} 1 & 0 & 0 & 0 \\ 0 & \cos ant & -\sin ant & 0 \\ 0 & \sin ant & \cos ant & 0 \\ 0 & 0 & 0 & 1 \end{bmatrix},$$

where $n = 0, 1, 2, \ldots, 6$.

In the above equation (1), Rot (a, b) is a rotational transformation representing a rotation around an axis "a" by an angle "b" (rad), and Trans (a, b, c) is a translational transformation representing a translation of a distance "a" in a direction of the X-axis, a distance "b" in a direction of the Y-axis and a distance "c" in a direction of the Z-axis. These homogeneous transformations are disclosed in, for example, Richard P. Paul, "Robot Manipulators: Mathematics, Programming, and Control, The computer Control of Robot Manipulators", The MIT Press, U.S.A., 1981 (referred to as a reference 1 hereinafter). The above equation (1) corresponds to the equation (2.35) of the reference 1.

Figure 12:
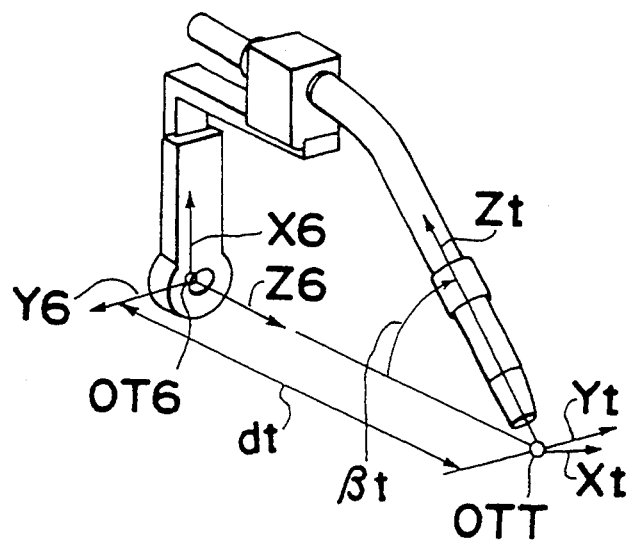
FIG. 12 is a perspective view showing details of respective coordinate systems set in a tool shown in FIG. 8.

In the present preferred embodiment, the coordinate system (X6, Y6, Z6) of the joint RJ6 is called a mechanical interface coordinate system, and the center OT6 of which is called a tool attachment reference point where the tool 2 is attached with the tool moving apparatus 11. In the tool 2, as shown in FIG. 12, the end of the welding torch of the tool 2 is located on the joint axis Z6, and the center OTT (referred to as a tool reference point hereinafter) of the tool coordinate system (Xt, Yt, Zt) is set at the end of the tool 2. Further, when a distance between the centers OT6 and OTT is denoted by dt and an angle between the joint axis Z6 and the axis Zt which is the center axis of the tool 2 is denoted by $\beta t$, a position and an attitude of the tool coordinate system (Xt, Yt, Zt) based on the above-mentioned mechanical interface coordinate system (X6, Y6, Z6) is represented by a 4×4 homogeneous transformation matrix Et of the following equation (2):

$$Et = Trans(0, 0, dt) \cdot Rot(Y6, \beta t) \cdot Rot(X6, \pi) \quad (2)$$

$$= \begin{bmatrix} 1 & 0 & 0 & 0 \\ 0 & 1 & 0 & 0 \\ 0 & 0 & 1 & dt \\ 0 & 0 & 0 & 1 \end{bmatrix} \cdot \begin{bmatrix} \cos\beta t & 0 & \sin\beta t & 0 \\ 0 & 1 & 0 & 0 \\ -\sin\beta t & 0 & \cos\beta t & 0 \\ 0 & 0 & 0 & 1 \end{bmatrix} \cdot$$

$$\begin{bmatrix} 1 & 0 & 0 & 0 \\ 0 & -1 & 0 & 0 \\ 0 & 0 & -1 & 0 \\ 0 & 0 & 0 & 1 \end{bmatrix}$$

$$= \begin{bmatrix} \cos\beta t & 0 & -\sin\beta t & 0 \\ 0 & -1 & 0 & 0 \\ -\sin\beta t & 0 & -\cos\beta t & dt \\ 0 & 0 & 0 & 1 \end{bmatrix}.$$

Figure 7:
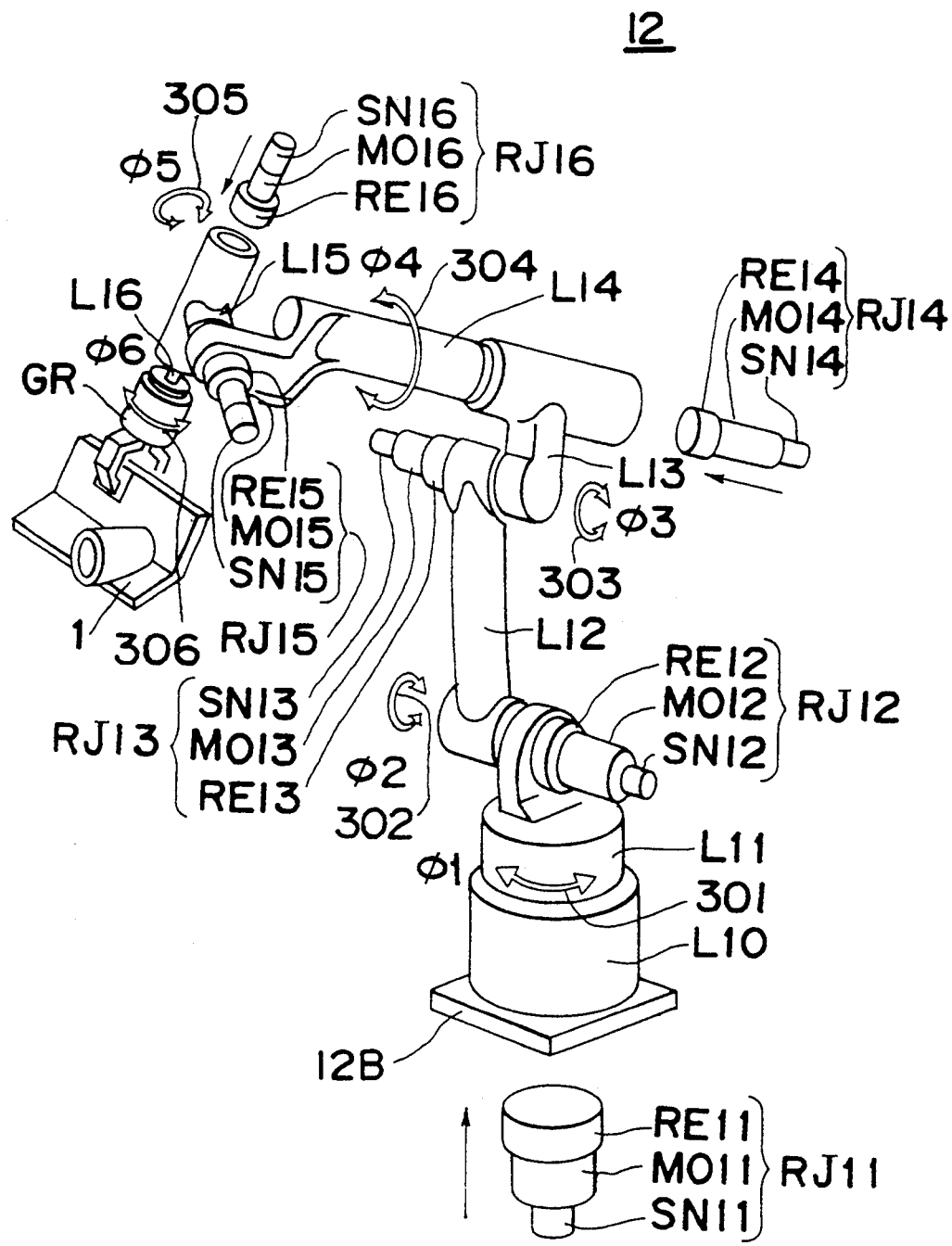
FIG. 7 is a perspective view showing a composition of a workpiece handling apparatus shown in FIG. 1.
Figure 8:
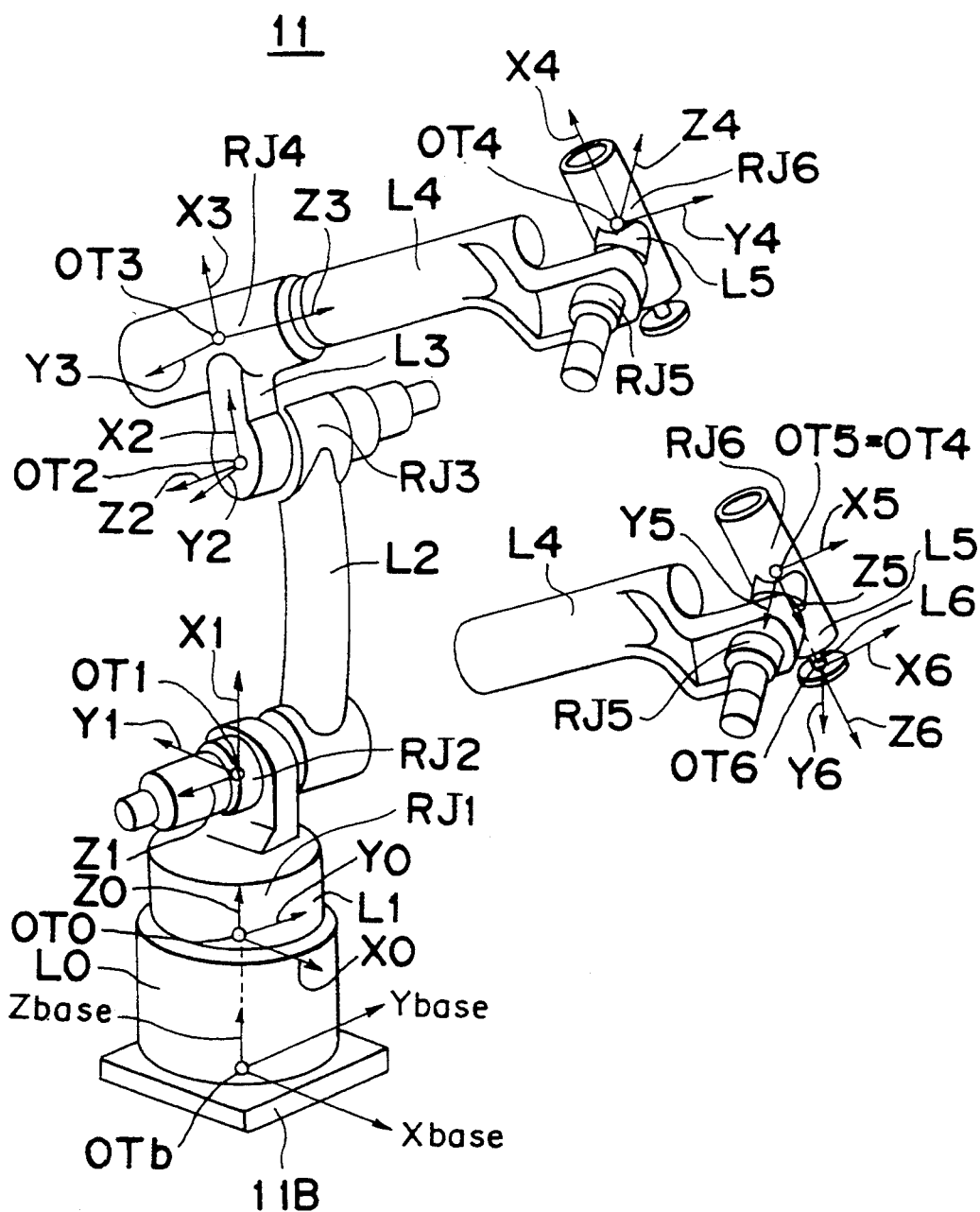
FIG. 8 is a perspective view showing respective coordinate systems set in the tool moving apparatus shown in FIG. 6.
Figure 9:
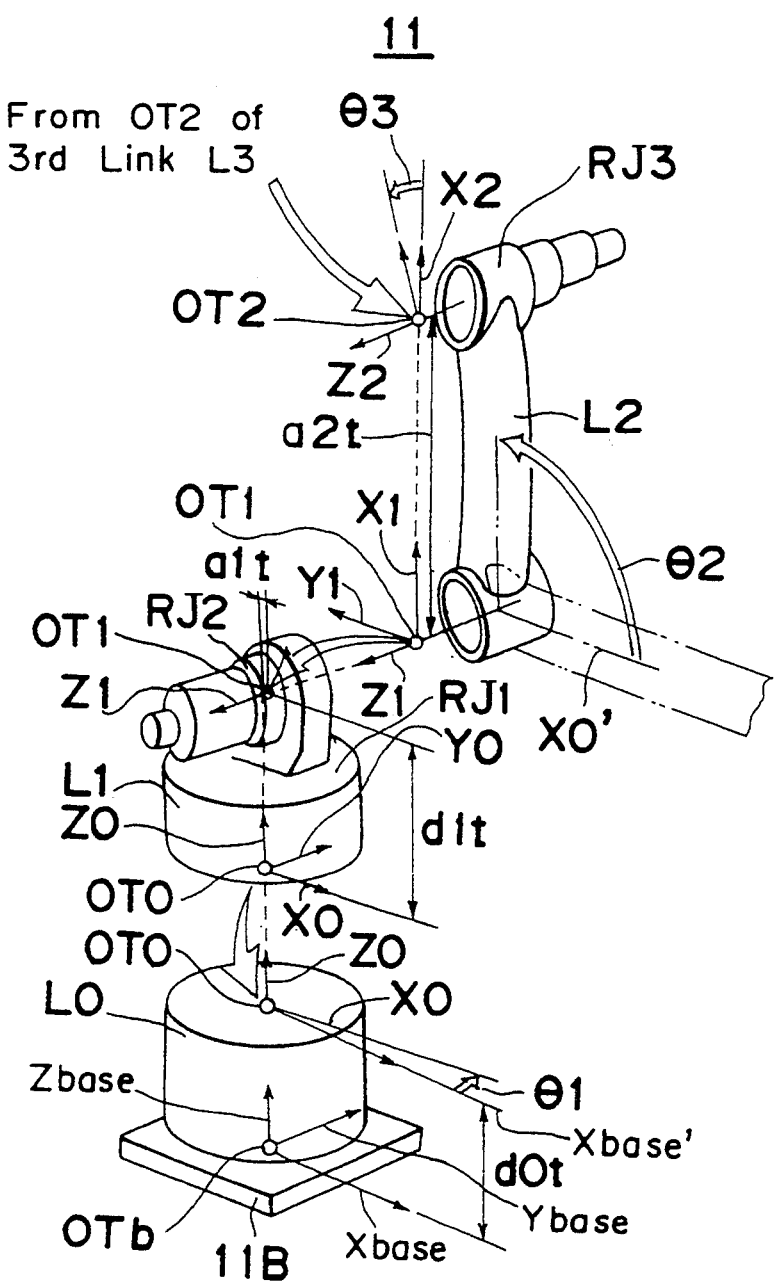
FIG. 9 is a perspective view showing details of respective coordinate systems set in a part of the tool moving apparatus shown in FIG. 8.
Figure 10:
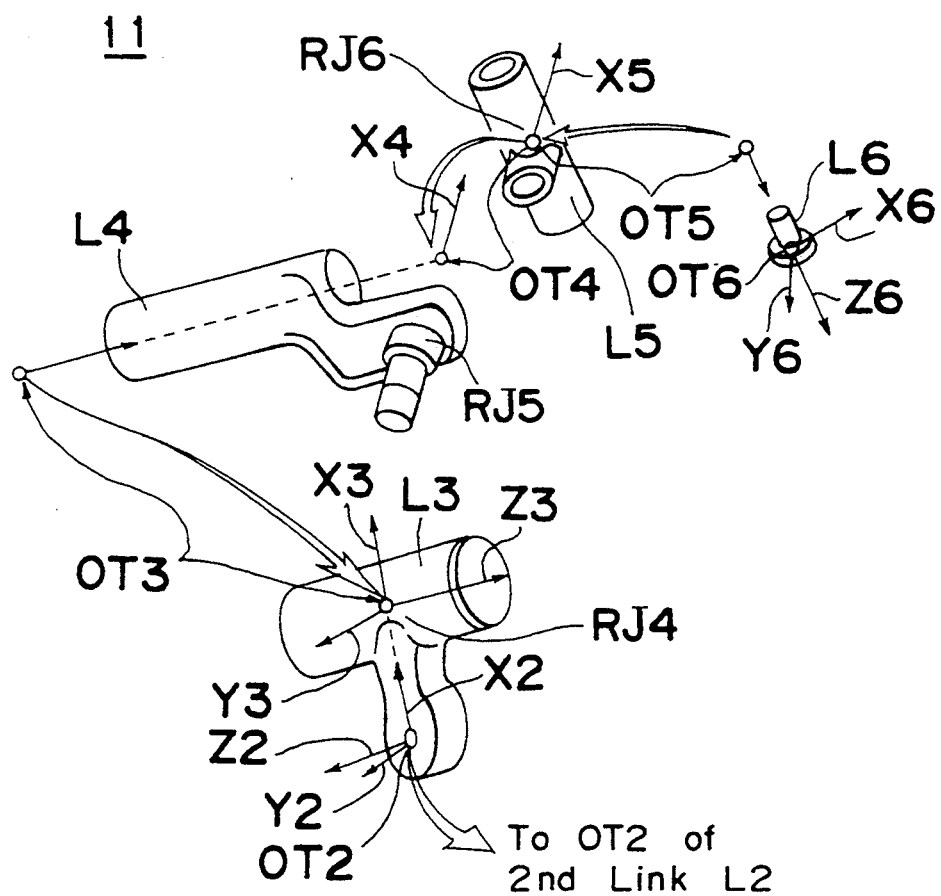
FIG. 10 is a perspective view showing details of respective coordinate systems set in another part of the tool moving apparatus shown in FIG. 8.
Figure 11:
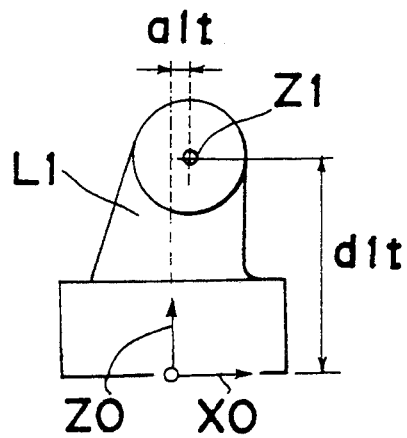
FIG. 11 is a side view showing details of respective coordinate systems set in the first link of the tool moving apparatus shown in FIG. 8.

On the other hand, referring back to FIG. 1, the workpiece handling apparatus 12 is arranged on a base 12B, and comprises six rotatable joints RJ11 to RJ16, and seven links L10 to L16 for connecting the adjacent joints, respectively. In the workpiece handling apparatus 12, the base 12B is connected through the 0-th link L10 to the first joint RJ11, which is connected through the first link L11 to the second joint RJ12, which is connected through the second L12 to the third joint RJ13. The joint RJ13 is connected through the third link L13 to the fourth joint RJ14, which is connected through the fourth link L14 to the fifth joint RJ15, which is connected through the fifth link L15 to the sixth joint RJ16. The sixth joint RJ16 is connected through the sixth link L6 and the griper GR for holding the workpiece 1 to the workpiece 1. As shown in FIG. 7, each of the joints RJk (k=11, 12, ..., 16) comprises a motor MOk of a servo motor, a rotation angle of which is controlled by the control unit 3, a speed reducer Rek for reducing the rotation speed of the motor MOk with a predetermined speed reduction ratio λk, and a sensor SNk for detecting the position of the rotation shaft after reducing the speed of the motor MOk, wherein the shafts thereof are rotated in directions indicated by arrows 301 to 306, respectively.

Figure 13:
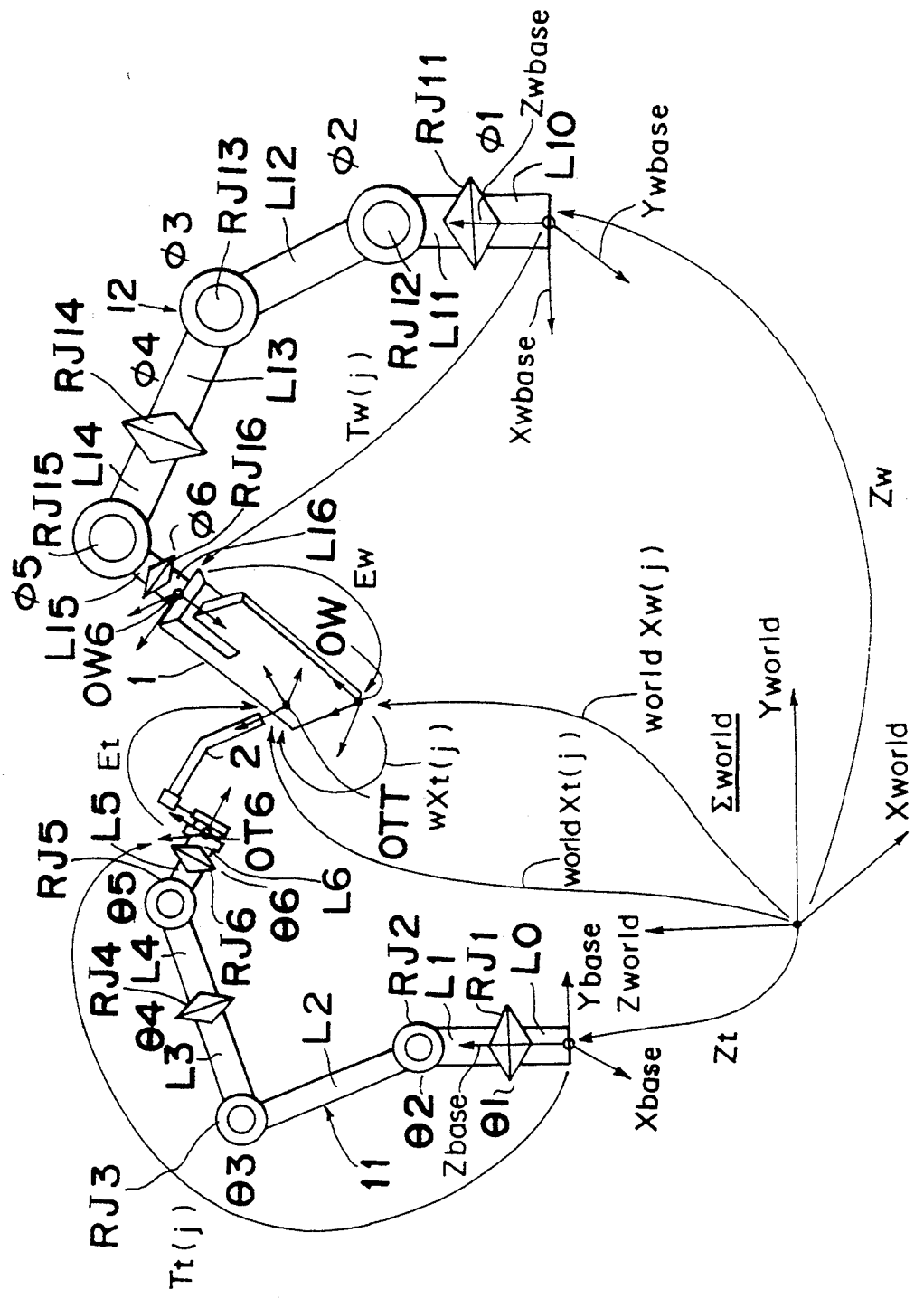
FIG. 13 is a schematic side view showing a relationship among respective coordinate systems set in the industrial robot system shown in FIG. 1.

In the workpiece handling apparatus 12, in a manner similar to that of the tool moving apparatus 11, three-dimensional coordinate systems are set as follows. As shown in FIG. 13, a workpiece reference coordinate system (Xwbase, Ywbase, Zwbase) is set in the base 12B, and a workpiece attachment reference point OW6 is set at the position where the griper GR is attached to the end of the sixth link L16. The workpiece attachment reference point may be set at the end of the griper GR where the workpiece 1 attached therewith.

Also, a workpiece coordinate system (Xw, Yw, Zw) with a center OW (referred to as a workpiece reference point hereinafter) is set at the end of the workpiece 1. Further, in respective joints RJ11 to RJ16 of the workpiece handling apparatus 12, joint variables $\phi_1$ to $\phi_6$ are defined in a manner similar to that of the tool moving apparatus 11. Furthermore, in respective link Ln+10 (n=0, 1, 2, ..., 6) of the workpiece handling apparatus 12, common normal distances $a_{nw}$, distances $d_{nw}$ between the links and twist angles $e_{nw}$ are defined in a manner similar to that of the tool moving apparatus 11.

Therefore, coordinate transformations in respective links Ln+10 (n=0, 1, 2, ..., 6) of the workpiece handling apparatus 12 are represented by homogeneous transformation matrices Anw of the following equation (3), using the link parameters in the representation of the Denavit-Hartenberg, in a manner similar to that of the tool moving apparatus 11:

$$(A)w(j) = Rot(Zj - 1, \phi n) \cdot Trans(0,0,d_{nw}) \cdot Trans(d_{nw},0,0) \cdot Rot(Xj - 1, a_{nw})$$

$$= \begin{bmatrix} \cos\phi n & -\sin\phi n & 0 & 0 \\ \sin\phi n & \cos\phi n & 0 & 0 \\ 0 & 0 & 1 & 0 \\ 0 & 0 & 0 & 1 \end{bmatrix} \cdot \begin{bmatrix} 1 & 0 & 0 & a_{nw} \\ 0 & 1 & 0 & 0 \\ 0 & 0 & 1 & d_{nw} \\ 0 & 0 & 0 & 1 \end{bmatrix} \cdot$$

$$\begin{bmatrix} 1 & 0 & 0 & 0 \\ 0 & \cos a_{nw} & -\sin a_{nw} & 0 \\ 0 & \sin a_{nw} & \cos a_{nw} & 0 \\ 0 & 0 & 0 & 1 \end{bmatrix},$$

where $n = 0, 1, 2, ..., 6$.

Further, a position and an attitude of the workpiece reference point OW based on the workpiece attachment reference point OW6 is represented by a 4×4 homogeneous transformation matrix Ew, in a manner similar to that of the equation (2) of the tool moving apparatus 11.

(2) Composition of Control Unit

Figure 2:
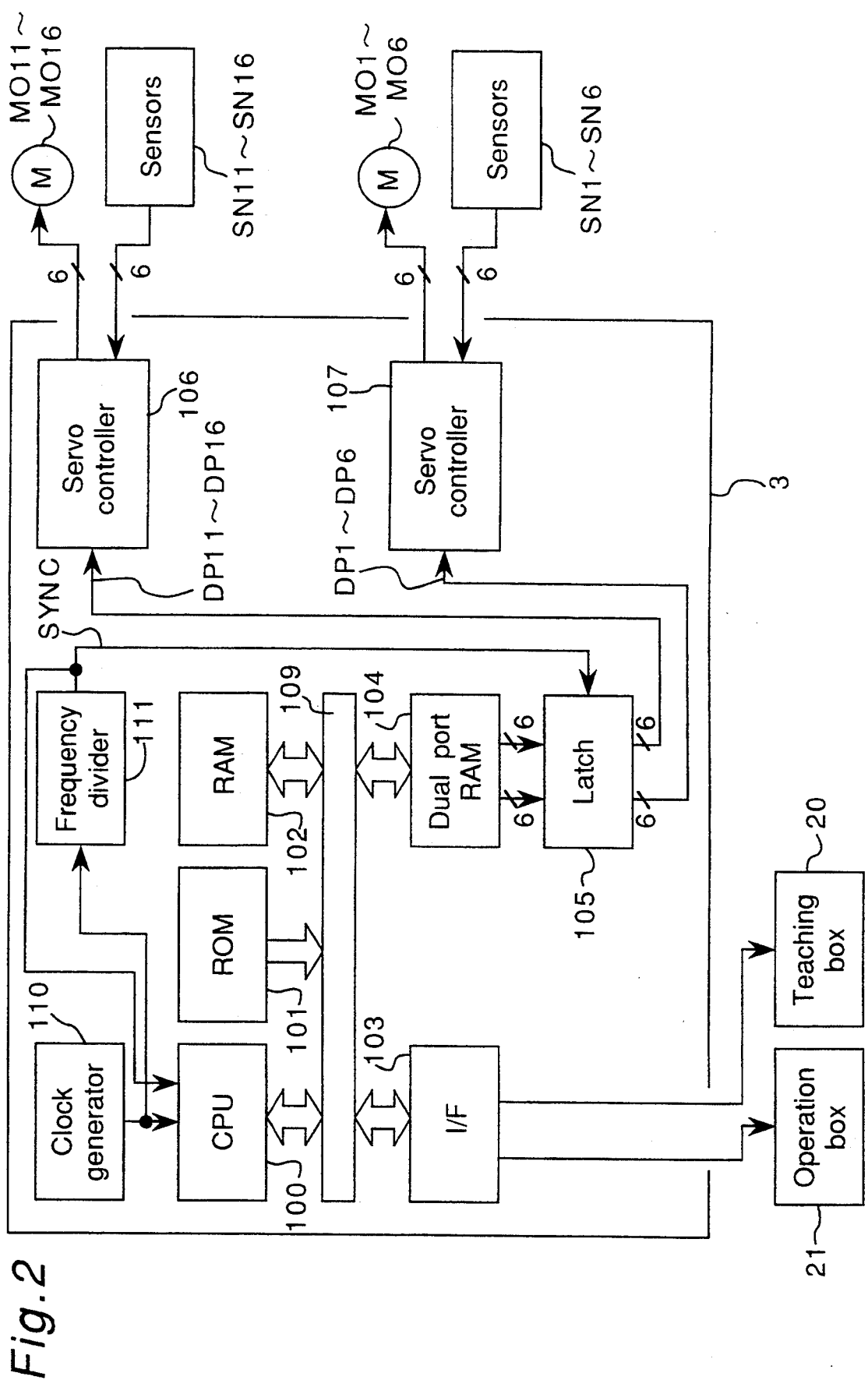
FIG. 2 is a schematic block diagram showing a control unit for the industrial robot system shown in FIG. 1.

FIG. 2 shows a composition of the control unit 2.

Referring to FIG. 2, the control unit 2 comprises:

(a) a central processing unit (referred to as a CPU hereinafter) for controlling operations of the tool moving apparatus 11 and the workpiece handling apparatus 12 according to a system program stored in a read only memory (referred to as a ROM hereinafter) 101 based on a clock signal generated by a clock generator 110 and a synchronizing signal SYNC generated by dividing the frequency of the clock signal with a predetermined frequency division ratio using a frequency divider 111;

(b) the ROM 101 for storing the system program for controlling respective operations of the tool moving apparatus 11 and the workpiece handling apparatus 12, and data required for executing the system program;

(c) a random access memory (referred to as a RAM hereinafter) for being used as a working memory of the CPU 100, and for storing task programs generated in a task program generation process;

(d) an interface 103 connected to the teaching box 20 and the operation box 21; and (e) a dual port RAM 104 for storing data of motor control values DPk and DPk+10 (k=1, 2, ..., 6) used for driving respective motors MO1 to MO6 and MO11 to MO16, wherein these circuit components 100 to 103 and the first port of the dual port RAM 104 are connected through bus 109 to each other. It is to be noted that processes with respect to respective switches SW1 to SW7 of the teaching box 20 and the operation box 21 are executed in an interruption process of the CPU 100.

The second port of the dual port RAM 104 is connected to a latch circuit 105 composed of latches. In synchronous with the synchronizing signal SYNC, the latch circuit 105 simultaneously latches data of the motor control values DPk and DPk+10 for driving respective motors MO1 to MO6 and MO11 to MO16, which are stored in the dural port RAM 104. Then, the latch circuit 105, simultaneously, outputs the latched data DP1 to DP6 through a servo controller 107 to the motors MO1 to MO6 so as to drive the motors MO1 to MO6, and outputs the latched data DP11 to DP16 through a servo controller 106 to the motors MO11 to MO16 so as to drive the motors MO11 to MO16. The period of the synchronizing signal SYNC corresponds to a period for driving the motors MO1 to MO6 and MO11 to MO16 in the manual operation process of the teaching operation, and also corresponds to a period for driving the motors MO1 to MO6 and MO11 to MO16 by each interpolation point in the playback operation process. The period of the synchronizing signal SYNC is set to a sum obtained by adding a small margin to a processing time of the control unit 2 required for each predetermined cycle in the teaching operation and for each interpolation in the playback operation. The period of the synchronizing signal SYNC is preferably smaller, however, it is necessary to provide a CPU having a higher speed processing time, resulting in an expensive control unit 2. In practice, the period of the synchronizing signal SYNC is set to be fallen in a range from 10 msec. to 70 msec.

The CPU 100 calculates data of the motor control values DPk and DPk+10 by dividing the joint variables calculated as described in detail later by the predetermined speed reduction ratio λk, and stores them in the dual port RAM 104.

Figure 3:
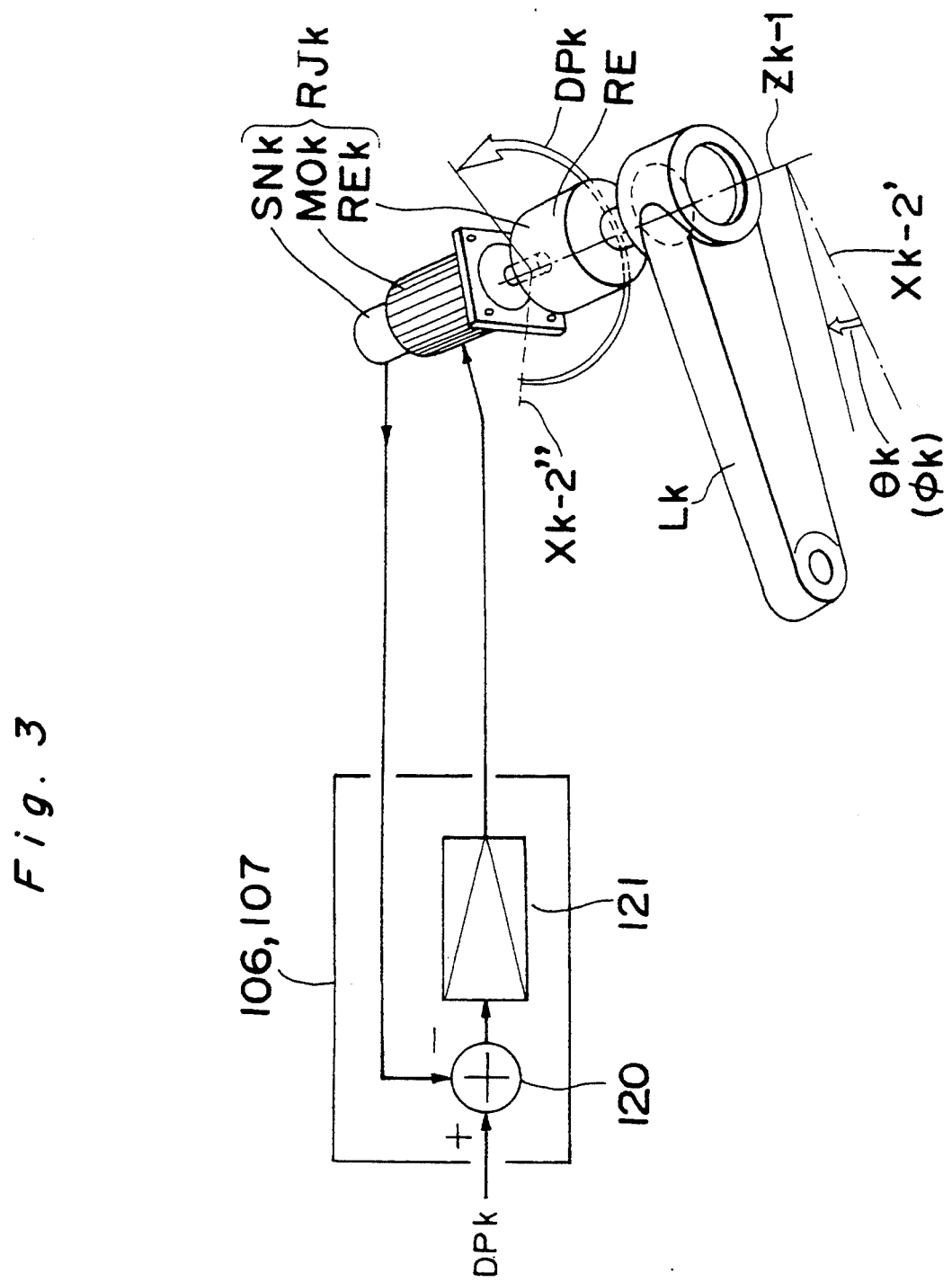
FIG. 3 is a perspective view showing a composition of each revolute joint of the industrial robot system shown in FIG. 1 and a schematic block diagram showing a servo controller of the control unit shown in FIG. 2.

FIG. 3 shows a structure of each joint RJk (k=1 to 6 and 11 to 16) and a composition of each of the servo controllers 106 and 107.

Referring to FIG. 3, the rotation shaft of the motor MOk is connected to the input shaft of the speed reducer REk, the speed reducer REk reduces the rotation speed of the motor MOk by the predetermined speed reduction ratio λk, and then, increases the torque generated by the motor MOk so as to multiply it by a reciprocal 1/λk of the speed reduction ratio and outputs the increased torque to the link Lk connected to the output shaft of the speed reducer REk. The rotation shaft of the motor MOk is connected to the shaft of the sensor SNk, and an output signal from the sensor SNk is inputted to a subtraction input terminal of an adder 120 provided in each of the servo controllers 106 and 107. On the other hand, digital data of the motor control values DPk from the latch circuit 105 are converted into analogue voltage signals by digital to analogue converters (not shown), and then, each of the analogue voltage signals is inputted to an addition input terminal of the adder 120. A voltage signal outputted from the adder 120 is applied through a voltage amplifier 121 having a predetermined amplification degree to a driving terminal of the motor MOk.

In the feedback system for the servo control constituted as described above, in response to the output signal from the sensor SNk, a rotation angle from the axis Xk-2″ which corresponds to the axis Xk-2′ parallel to the axis Xk-2 and extending from the joint axis Zk-1 and extends from the rotation shaft of the motor MOk is controlled to be a value corresponding to the motor control value DPk, and then, the link Lk is rotated from the axis Xk-2′ by the joint variable $\theta k$ or $\phi k$.

Figure 4:
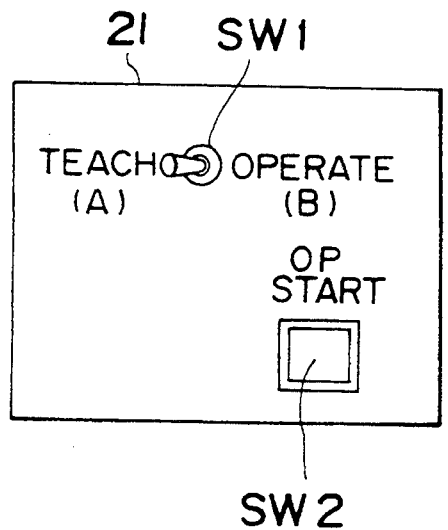
FIG. 4 is a front view showing an operation box shown in FIG. 2.

FIG. 4 shows a front view of the operation box 21. Referring to FIG. 4, there are provided on the operation box 21, a process switch SW1 for selectively switching over between a side A for performing the teaching operation process, i.e., the manual operation process and a side B for performing the playback operation process, and a start switch SW2 for starting executing the playback operation process.

Figure 5:
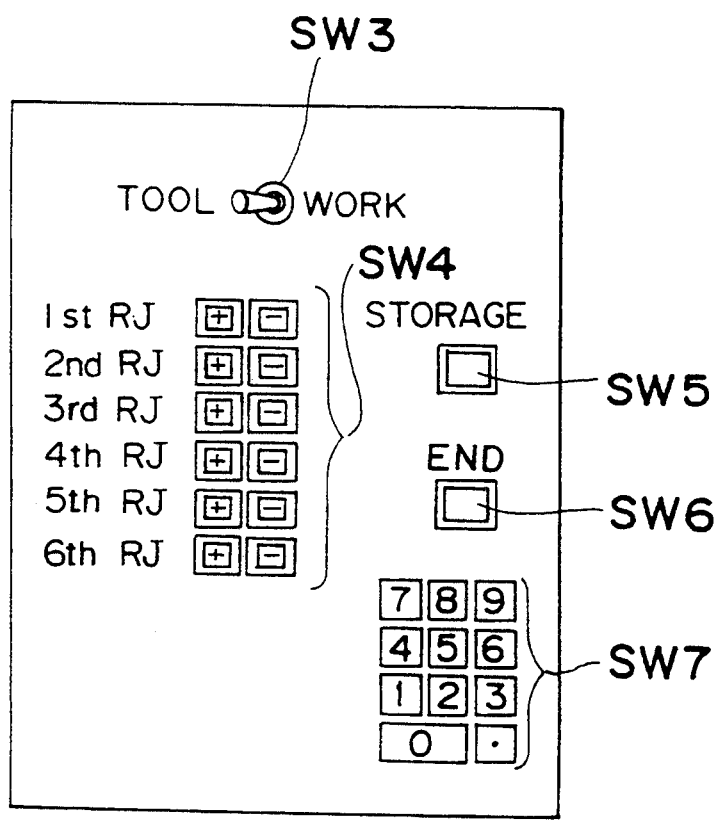
FIG. 5 is a front view showing a teaching box shown in FIG. 2.

FIG. 5 shows a front view of the teaching box 20 for being manually operated by the operator in the teaching operation process.

Referring to FIG. 5, there are provided on the teaching box 20, an apparatus specifying switch SW3 for specifying either one of the apparatuses 10 and 11 to be controlled, twelve rotation instructing switches SW4 composed of six positive switches for rotating the motors MOk of the first to sixth joints of the apparatus 10 or 11 specified by the apparatus specifying switch SW3 in a counterclockwise direction when seen from the upper side of the joint axis Zk-1 and six negative switches for rotating them in a clockwise direction similarly, a storage switch SW5 for instructing the CPU 100 to execute the teaching data calculation process, an end switch SW6 for instructing the CPU 100 to execute the task program generation process, thereby completing the teaching operation, and a set of ten keys SW7 for inputting data of the translational speed of the tool 2 in the teaching data calculation process.

(3) Principle of Control Method

A control method used in the industrial robot system of the present preferred embodiment will be described below, in an order of the teaching operation and the playback operation.

(3-1) Teaching Operation

A case of generating the j-th teaching data in the j-th teaching operation among a plurality of teaching operations will be described below.

A homogeneous transformation matrix Tt(j) representing a position and an attitude of the coordinate system (X6, Y6, Z6) set at the tool attachment reference point OT6 based on the reference coordinate system (Xbase, Ybase, Zbase) set on the baseplane (the Xbase-Ybase plane) of the tool moving apparatus 11 is represented by products of the homogeneous transformation matrices Ant of respective links Ln (n=0, 1, 2, ..., 6), corresponding to the equation (2.40) of the reference 1, as follows:

$$Tt(j) = A0t.A1t.A2t.A3t.A4t.A5t.A6t \qquad (4).$$

Hereinafter, "a position and an attitude of the coordinate system (X6, Y6, Z6) set at the tool attachment reference point OT6 based on the reference coordinate system (Xbase, Ybase, Zbase) set on the baseplane (the Xbase-Ybase plane) of the tool moving apparatus 11" is referred to as "a position and an attitude of the tool attachment reference point OT6 based on the baseplane of the tool moving apparatus 11". The other positions and attitudes are expressed in a manner similar to that of above.

On the other hand, a homogeneous transformation matrix Tw(j) representing a position and an attitude of the workpiece attachment reference point OW6 based on the baseplane (the Xwbase-Ywbase plane) of the workpiece handling apparatus 12 is represented by products of the homogeneous transformation matrices Anw of respective links Ln+10 (n=0, 1, 2, ..., 6), in a manner similar to that of the equation (4), as follows:

$$Tw(j) = A0w.A1w.A2w.A3w.A4w.A5w.A6w \qquad (5).$$

A homogeneous transformation matrix worldXw(j) representing a position and an attitude of the workpiece reference point OW based on a predetermined world coordinate system Σworld shown in FIG. 13 is represented using the homogeneous transformation matrix Tw(j) of the equation (5) by the following equation (6):

$$worldXw(j) = Zw.Tw(j).Ew \qquad (6).$$

where Zw is a homogeneous transformation matrix representing a position and an attitude of the baseplane (the Xwbase-Ywbase plane) of the workpiece handling apparatus 12 based on the world coordinate system Σworld, and data of the homogeneous transformation matrices Zw and Ew are previously stored in the ROM 101.

Further, a homogeneous transformation matrix worldXt(j) representing a position and an attitude of the tool reference point OTT based on the world coordinate system Σworld shown in FIG. 13 is represented using the homogeneous transformation matrix Tt(j) of the equation (4) by the following equation (7):

$$worldXt(j) = Zt.Tt(j).Et \qquad (7),$$

where Zt is a homogeneous transformation matrix representing a position and an attitude of the baseplane (the Xbase-Ybase plane) of the tool moving apparatus 11 based on the world coordinate system Σworld, and data of the homogeneous transformation matrices Zt and Et are previously stored in the ROM 101.

Further, when a homogeneous transformation matrix representing a position and an attitude of the tool reference point OTT based on the workpiece reference point OW is denoted by wXt(j), a homogeneous transformation matrix worldXt(j) representing a position and an attitude of the tool reference point OTT based on the world coordinate system Σworld is represented by the following equation (8):

$$worldXt(j) = worldXw.(j).wXt(j) \qquad (8).$$

Therefore, the homogeneous transformation matrix wXt(j) is represented from the above equation (8) by the following equation (9):

$$wXt(j) = worldXw(j)^{-1}.worldXt(j) \qquad (9).$$

Figure 15:
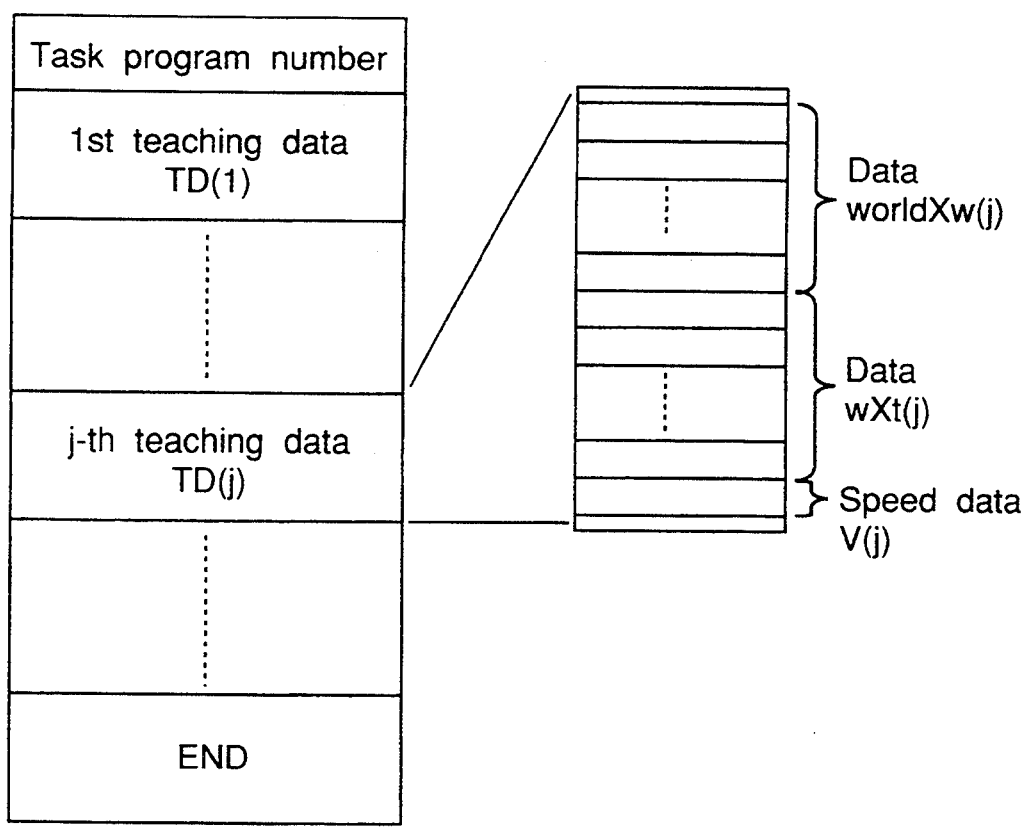
FIG. 15 is a schematic diagram showing a composition of a task program stored in a RAM shown in FIG. 2.

Further, in the teaching data calculation process of the teaching operation, data of the translational speed V(j) of the tool 2 to the workpiece 1 when the tool 2 is moved from the previous (j−1)-th teaching point to the j-th teaching point to be taught are inputted using a set of ten keys SW7 by the operator. Then, data of the homogeneous transformation matrix worldXw(j) calculated using the equation (6), the homogeneous transformation matrix wXt(j) calculated using the equation (9) and the translational speed V(j) inputted using a set of ten keys SW7 are stored as a set of the j-th teaching data TD(j) in the RAM 102. The above-mentioned process is repeated the number of times equal to the number of required teaching points, and then, a task program composed of a plurality of sets of teaching data TD(j) is generated and is stored in the RAM 102 as shown in FIG. 15.

(3-2) Playback Operation

A case of moving the tool 2 based on the workpiece 1 toward a position of the (j−1)-th teaching point after completion of the playback operation process of the j-th teaching point will be described below.

First of all, the following calculation process for the movement of the tool reference point OTT based on the workpiece reference point OW is performed using data of the homogeneous transformation matrices wXt(j) and wXt(j+1) and the translational speed V(j+1) among the j-th teaching data TD (j) composed of wXt(j), worldXw(j) and V(j) and the (j+1)-th teaching data TD(j+1) composed of wXt(j+1), worldXw(j+1) and V(j+1).

The homogeneous transformation matrix wXt(j) at the j-th teaching point is represented by the following equation (10):

$$wXt(j) = \begin{bmatrix} tn1j & to1j & ta1j & txj \\ tn2j & to2j & ta2j & tyj \\ tn3j & to3j & ta3j & tzj \\ 0 & 0 & 0 & 1 \end{bmatrix} \qquad (10)$$

Nine data from the first row and the first column to the third row and the third column located in the upper left part of the matrix of the right side of the equation (10) represents an attitude of the tool 1 based on the workpiece reference point OW at the j-th teaching point, namely, the attitude of the coordinate system set at the tool reference point OTT. Further, three data from the first row and the fourth column to the third row and the fourth column located in the rightmost part of the matrix of the right side of the equation (1) represents a position of the tool reference point OTT of the tool 1 based on the workpiece reference point OW at the j-th teaching point.

Further, a homogeneous transformation matrix wXt(j+1) at the (j+1)-th teaching point is represented by the following equation (11), in a manner similar to that of the equation (10):

$$wXt(j+1) = \begin{bmatrix} tn1j+1 & to1j+1 & ta1j+1 & txj+1 \\ tn2j+1 & to2j+1 & ta2j+1 & tyj+1 \\ tn3j+1 & to3j+1 & ta3j+1 & tzj+1 \\ 0 & 0 & 0 & 1 \end{bmatrix} \qquad (11)$$

Therefore, a homogeneous transformation matrix δt(j+1) (referred to as a translational increment matrix hereinafter) representing art increment of a translational movement of the tool reference point OTT from the j-th teaching point toward the (j+1)-th teaching point is represented .by the following equation (12), from the above equations (1) and (11):

$$\delta pt(j+1) = \begin{bmatrix} 1 & 0 & 0 & txj+1-txj \\ 0 & 1 & 0 & tyj+1-tyj \\ 0 & 0 & 1 & tzj+1-tzj \\ 0 & 0 & 0 & 1 \end{bmatrix} \qquad (12)$$

In this case, since the translational speed in the translational movement of the tool reference point OTT from the j-th teaching point toward the (j+1)-th teaching point is inputted and stored as data V(j+1) in the RAM 102, a required time T(j+1) which it takes in this translational movement and a translational increment matrix Δpt(j+1) of the tool reference point OTT per a predetermined unit time are represented by the following equations (13) and (14), respectively:

$$T(j+1) = |\delta pt(j+1)|/V(j+1), \text{ and} \qquad (13)$$

$$\Delta pt(j+1) = \begin{bmatrix} 1 & 0 & 0 & (txj+1-txj)/T(j+1) \\ 0 & 1 & 0 & (tyj+1-tyj)/T(j+1) \\ 0 & 0 & 1 & (tzj+1-tzj)/T(j+1) \\ 0 & 0 & 0 & 1 \end{bmatrix} \qquad (14)$$

On the other hand, a calculation process with respect to changes in the attitudes of the workpiece 1 and the tool 2 is performed on the following assumption with respect to a rotation movement of the tool 2 of the welding torch from the j-th teaching point toward the (j+1)-th teaching point. Namely, when tile tool 2 is rotated around a predetermined rotational center vector Krt(j) by an angle φt(j), it is assumed that the attitude of the tool 2 at the j-th teaching point becomes the attitude of the tool 2 at the (j+1) teaching point. In this case, a homogeneous transformation matrix Rot(Krt(j), φt(j) ) representing this rotational movement is represented by the following equation (15):

$$Rot(Krt(j), \phi t(j)) = \begin{bmatrix} tn1j & to1j & ta1j & 0 \\ tn2j & to2j & ta2j & 0 \\ tn3j & tao3j & ta3j & 0 \\ 0 & 0 & 0 & 1 \end{bmatrix}^{-1} \qquad (15)$$

-continued $$\begin{bmatrix} tn1j+1 & to1j+1 & ta1j+1 & 0 \\ tn2j+1 & to2j+1 & ta2j+1 & 0 \\ tn3j+1 & to3j+1 & ta3j+1 & 0 \\ 0 & 0 & 0 & 1 \end{bmatrix}.$$

Then, the calculation result of the right side of the equation (15) is represented in a form of the following equation (16):

$$Rot(Krt(j),\phi t(j)) = \begin{bmatrix} Nxj & Oxj & Cxj & 0 \\ Nyj & Oyj & Cyj & 0 \\ Nzj & Ozj & Czj & 0 \\ 0 & 0 & 0 & 1 \end{bmatrix}. \quad (16)$$

Thereafter, the X-component Krtx (j), the Y-component Krty(j) and the Z-component Krtz (j) of the abovedefined rotational center vector Krt(j) and the abovedefined angle $\phi t(j)$ are represented by the following equations (17) to (19), respectively:

$$Krtx(j)=(Ozj-Czj)/[2.\sin(\phi t(j))] \quad (17),$$

$$Krty(j)=(Cxj-Nzj)/[2.\sin(\phi t(j))] \quad (18),$$

and $$Krtz(j)=(Nyj-Oxj)/[2.\sin(\phi t(j))] \quad (19),$$

where $$\phi t(j)=\cos^{-1}[(Nxj+Oyj+Czj-1)/2], \text{ for } 0\leq\phi t(j)\leq\pi \quad (20).$$

Therefore, a homogeneous transformation matrix (referred to a rotational increment matrix hereinafter) representing the rotational increment of the tool reference point per the unit time becomes $\phi t(j)/T(j+1)$. Since the above-mentioned rotational movement is caused around the rotational center vector Krt(j) calculated using the equations (17) to (19) as described above, a homogeneous transformation matrix $\Delta Rt(j)$ representing the position and attitude of the tool reference point OTT per the unit time is represented by the following equation (21):

$$\Delta Rt(j)=Rot(Krt(j),\phi t(j)/T(j+1)) \quad (21).$$

Next, a movement of the workpiece reference point OW based on the world coordinate system $\Sigma$world will be described below.

A translational increment matrix Apw(j+1) of the workpiece reference point OW per the unit time and a rotational increment matrix $\Delta Rw(j)$ thereof are obtained from the homogeneous transformation matrices worldXw(j) and worldXw(j+1), as follows. In this case, since there is not given the translational speed of the workpiece 1, it is calculated based on the required time T(j+1) calculated using the equation (13). Namely, the homogeneous transformation matrices worldXw(j) and worldXw(j+1) are represented by the following equations (22) and (23):

$$worldXw(j) = \begin{bmatrix} wn1j & wo1j & wa1j & wxj \\ wn2j & wo2j & wa2j & wyj \\ wn3j & wo3j & wa3j & wzj \\ 0 & 0 & 0 & 1 \end{bmatrix}, \text{ and} \quad (22)$$

$$worldXw(j+1) = \begin{bmatrix} wn1j+1 & wo1j+1 & wa1j+1 & wxj+1 \\ wn2j+1 & wo2j+1 & wa2j+1 & wyj+1 \\ wn3j+1 & wo3j+1 & wa3j+1 & wzj+1 \\ 0 & 0 & 0 & 1 \end{bmatrix}. \quad (23)$$

Therefore, the translational increment matrix Apw(j+1) of the workpiece reference point OW of the workpiece 1 per the unit time and the rotational increment matrix $\Delta Rw(j)$ thereof are represented by the following equations (24) and (25), in manners similar to those of the equations (14) and (21):

$$\Delta pw(j+1) = \begin{bmatrix} 1 & 0 & 0 & (wxj+1-wxj)/T(j+1) \\ 0 & 1 & 0 & (wyj+1-wyj)/T(j+1) \\ 0 & 0 & 1 & (wzj+1-wzj)/T(j+1) \\ 0 & 0 & 0 & 1 \end{bmatrix}, \quad (24)$$

and $$\Delta Rw = Rot(Krw(j), \phi w(j)/T(j+1)), \quad (25)$$

where a rotational transformation of a rotational center vector Krw(j) of the workpiece reference point OW of the workpiece 1 and a rotation angle $\phi w(j)$ thereof is represented by the following equation (26), in a manner similar to that of the equation (15):

$$Rot(Krw(j),\phi w(j)) = \begin{bmatrix} wn1j & wo1j & wa1j & 0 \\ wn2j & wo2j & wa2j & 0 \\ wn3j & wo3j & wa3j & 0 \\ 0 & 0 & 0 & 1 \end{bmatrix}^{-1} \cdot \quad (26)$$

$$\begin{bmatrix} wn1j+1 & wo1j+1 & wa1j+1 & 0 \\ wn2j+1 & wo2j+1 & wa2j+1 & 0 \\ wn3j+1 & wo3j+1 & wa3j+1 & 0 \\ 0 & 0 & 0 & 1 \end{bmatrix}.$$

Then, the process for planning the trajectory of the workpiece 1 and the tool 2 which are moved from the j-th teaching point toward the (j+1)-th teaching point is completed.

Next, the trajectory of the workpiece 1 and the tool 2 moving from the j-th teaching point toward the (j+1) teaching point is divided into a predetermined number of interpolation trajectory so that the required time between adjacent interpolation points becomes the same as each other, and the interpolation points obtained by dividing the trajectory thereof are calculated using the following straight line interpolation method. A process for calculating the i-th interpolation point in the movement from the (n−1)-th interpolation point toward the i-th interpolation point on the trajectory from the j-th teaching point toward the (j+1)-th teaching point will be described below.

First of all, in the case of a time interval $\Delta t$ of one divided interpolation interval between the adjacent interpolation points, an interpolation passed time Tpi which it takes in the movement from the j-th teaching point to the i-th interpolation point is represented by the following equation (27):

$$Tpi = \Delta t \times i \tag{27}$$

A homogeneous transformation matrix worldXw(j, i) representing the position and attitude of the workpiece reference point OW based on the world coordinate system Σworld at the i-th interpolation point is represented by the following equation (28):

$$worldXw(j,i) = \tag{28}$$
$$worldXw(j) \cdot \Delta pw(Tpi) \cdot Rot(Krw(j), Tpi \cdot \phi w(j)/T(j+1)),$$

where a translational increment matrix Δpw(Tpi) of the workpiece reference point OW per the unit time at a timing (referred to as an interpolation passed time Tpi hereinafter) when the interpolation passed time Tpi has been passed is represented by the following equation (29):

$$\Delta pw(Tpi) = \begin{bmatrix} 1 & 0 & 0 & (wxj+1-wxj) \cdot Tpi/T(j+1) \\ 0 & 1 & 0 & (wyj+1-wyj) \cdot Tpi/T(j+1) \\ 0 & 0 & 1 & (wzj+1-wzj) \cdot Tpi/T(j+1) \\ 0 & 0 & 0 & 1 \end{bmatrix} \tag{29}$$

In a manner similar to that of above, a homogeneous transformation matrix wXt ( j, i ) representing the position and attitude of the tool reference point OTT based on the workpiece reference point OW at the i-th interpolation point is represented by the following equation (30):

$$wXt(j,i) = wXt(j) \cdot \Delta pt(Tpi) \cdot Rot(Krt(j), Tpi \cdot \phi t(j)/T(j+1)), \tag{30}$$

where a translational increment matrix Δpt(Tpi) of the tool reference point OTT per the unit time at the interpolation passed time Tpi is represented by the following equation (31):

$$\Delta pt(Tpi) = \begin{bmatrix} 1 & 0 & 0 & (txj+1-txj) \cdot Tpi/T(j+1) \\ 0 & 1 & 0 & (tyj+1-tyj) \cdot Tpi/T(j+1) \\ 0 & 0 & 1 & (tzj+1-tzj) \cdot Tpi/T(j+1) \\ 0 & 0 & 0 & 1 \end{bmatrix} \tag{31}$$

Further, at a time T (j, i) corresponding to the interpolation passed time Tpi at the i-th interpolation point located on the trajectory from the j-th teaching point to the (j+1)-th teaching point, a homogeneous transformation matrix worldXw (j, i) is represented in a manner similar to that of the equation (5) by the following equation (32):

$$worldXw(j,i) = Zw \cdot Tw(j,i) \cdot Ew \tag{32}$$

Further, a homogeneous transformation matrix Tw(j, i) of the following equation (33) representing the position and attitude of the workpiece attachment reference point OW6 based on the baseplane of the workpiece handling apparatus 12 is obtained from the above equation (32):

$$worldXw(j,i) = Zw \cdot Tw(j,i) \cdot Ew^{-1} \tag{33}$$

Further, the following equations (35) and (35) are obtained corresponding to the homogeneous transformation matrices (7) and (8) representing the position and attitude of the tool reference point OTT based on the world coordinate system Σworld, respectively:

$$worldXt(j,i) = Zt \cdot Tt(j,i) \cdot Et \tag{34}$$

and $$worldXt(j,i) = worldXw(j,i) \cdot wXt(j,i) \tag{35}$$

Since the right side of the equation (34) is equal to that of the equation (35), this gives the following equation (36):

$$Zt \cdot Tt(j,i) \cdot Et = worldXw(j,i) \cdot wXt(j,i) \tag{36}$$

Therefore, a homogeneous transformation matrix Tt(j, i) of the following equation (37) representing the position and attitude of the tool attachment reference point OT6 based on the baseplane of the tool moving apparatus 11 is obtained from the above equation (36):

$$Tt(j,i) = Zt^{-1} \cdot Zw \cdot Tw(j,i) \cdot Ew \cdot wXt(j,i) \cdot Et^{-1} \tag{37}$$

Respective joint variables $\theta 1$ to $\theta 6$ and $\phi 1$ to $\phi 6$ of the tool moving apparatus 11 and the workpiece handling apparatus 12 are calculated by performing an inverse transformation for the homogeneous transformation matrix Tt(j, i) represented by the above equation (37) and the homogeneous transformation matrix Tw(j, i) represented by the above equation (33). Thereafter, there are calculated the motor control values DPk and DPk+10 corresponding to the calculated joint variables $\theta 1$ to $\theta 6$ and $\phi 1$ to $\phi 6$, and then, data thereof are stored in the dual port RAM 104. Thereafter, at a timing when the interpolation passed time Tpi has been passed, respective data stored in the dual port RAM 104 are simultaneously latched in synchronous with the synchronizing signal SYNC by the latch circuit 105, and at the same time, these data are outputted through the servo controllers 106 and 107 to the motors MO1 to MO6 and MO11 to MO16 so as to simultaneously drive the motors MO1 to MO6 and MO11 to MO16. The above-mentioned process is repeated until the interpolation passed time Tpi is equal to the required time T(j+1), namely, the tool reference point OTT of the tool 2 reaches the (j+1)-th teaching point.

Furthermore, since the 0-th teaching data TD(0) required in the movement toward the first teaching point do not exit in the task program of the RAM 102, data of the position and attitude at the start timing of the playback operation process are stored as the 0-th teaching data TD(0) in the RAM 102. Namely, since data of the motor control values DPk and DPk+10 corresponding to respective joint variables $\theta 1$ to $\theta 6$ and $\phi 1$ to $\phi 6$ which have been currently set are stored in tile dual port RAM 104, respective joint variables $\theta 1$ to $\theta 6$ and $\phi 1$ to $\phi 6$ of the tool moving apparatus 11 and the workpiece handling apparatus 12 are inversely calculated from the data of the motor control values DPk and DPk+10 (k=1, 2, ..., 6) at the staring timing of the playback operation process in a manner similar to that of the above-mentioned teaching data calculation process, and then, data of the joint variables $\theta 1$ to $\theta 6$ and $\phi 1$ to $\phi 6$ are substituted into the above equations (6) and (9) to calculate the homogeneous transformation matrices worldXw(0) and wXt(0). Data of these calculated homogeneous transformation matrices worldXw(0) and wXt(0) are stored as the 0-th teaching data TD(0) at the 0-th teaching point in the RAM 102.

(4) Process of Control Unit

The control process of the industrial robot system executed by the control unit 3 will be described below. It is to be noted that, in the present preferred the teaching operation include the manual operation process (step S7), the teaching data calculation process (step S8) and the task program generation process (step S9) which are shown in FIG. 16.

(4-1) Main Routine

Figure 16:
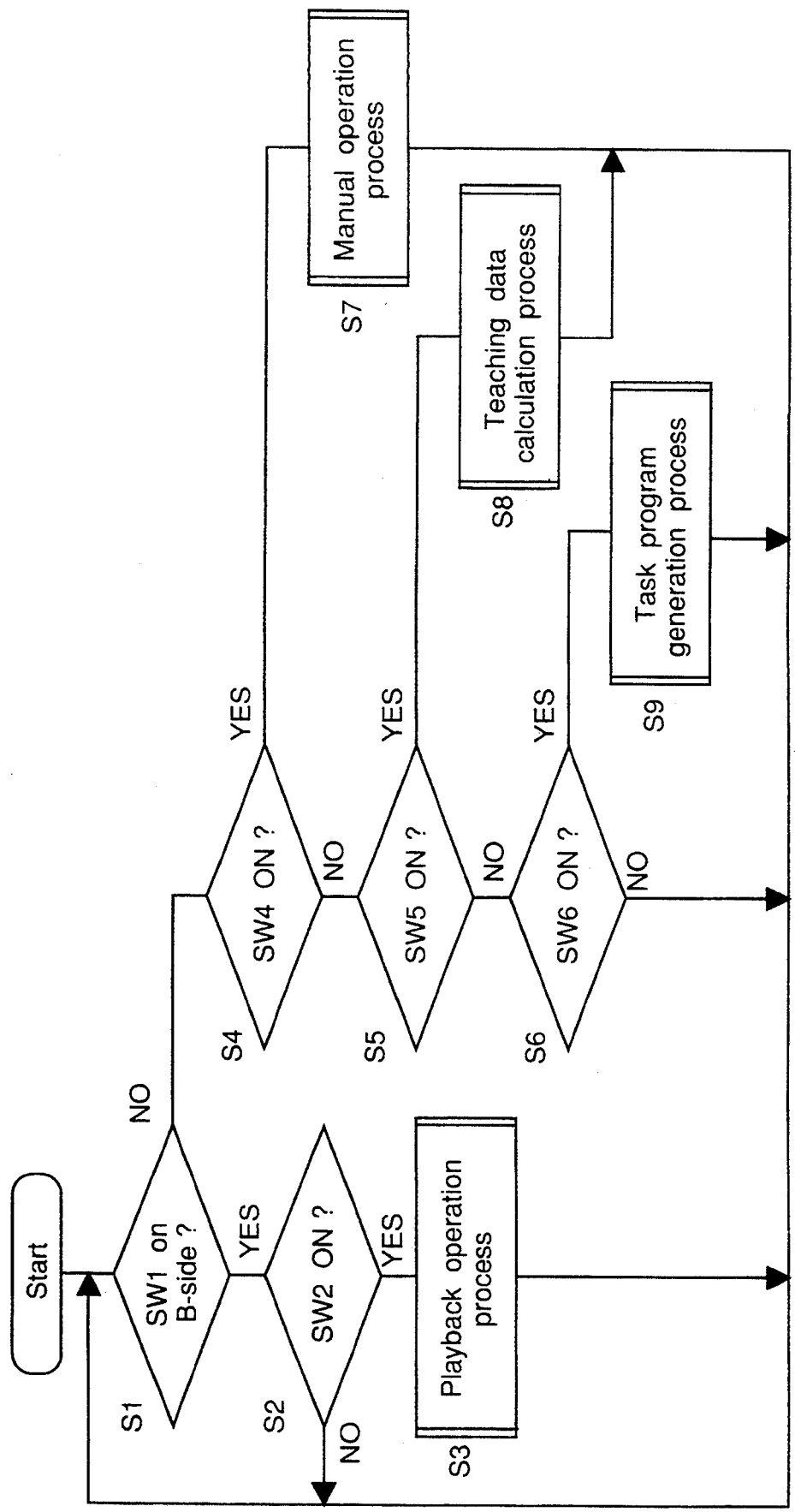
FIG. 16 is a flow chart showing a main routine executed by the control unit shown in FIG. 2.

FIG. 16 shows the main routine executed by the control unit 3.

Referring to FIG. 16, the main routine is started when the control unit 3 is turned on. First of all, it is judged at step S1 whether the process switch SW1 of the operation box 21 is switched over to the side B (the automatic operation) or the side A (the teaching operation). If the process switch SW1 is switched over to the side B (YES at step S1), the program flow goes to step S2. On the other hand, if the process switch SW1 is switched over to the side A (NO at step S1), the program flow goes to step S4. At step S2, it is judged whether the start switch SW2 is turned on. If the start switch SW2 is turned on (YES at step S2), there is executed the playback operation process shown in FIG. 19 at step S3, and then, the program flow goes back to step S1. On the other hand, if the start switch SW2 is not turned on (NO at step S2), the program flow directly goes back to step S1.

At steps S4, S5 and S6, it is judged sequentially whether or not the switches SW4, SW5 and SW6 are turned on, respectively, and then, the program flow goes back to step S1. When either one of the rotation instructing switches SW4 is turned on (YES at step S4), there is executed the manual operation process shown in FIG. 17 at step S7, and then, the program flow goes back to step S1. Further, if the storage switch SW5 is turned on (YES at step S5), there is executed the teaching data calculation process shown in FIG. 18 at step S8, and then, the program flow goes back to step S1. Furthermore, if the end switch SW6 is turned on (YES at step S6), there is executed the task program generation process at step S9, and then, the program flow goes back to step S1. In the task program generation process, as shown in FIG. 15, one task program number is added to a set of teaching data TD(j) (j=1, 2, ..., m; m is a natural number) at a plurality of teaching points representing a series of tasks which are calculated in the teaching data calculation process of step S8, and these data are stored in the RAM 102.

Therefore, the operator performs the teaching operation according to the following procedure.

Figure 17:
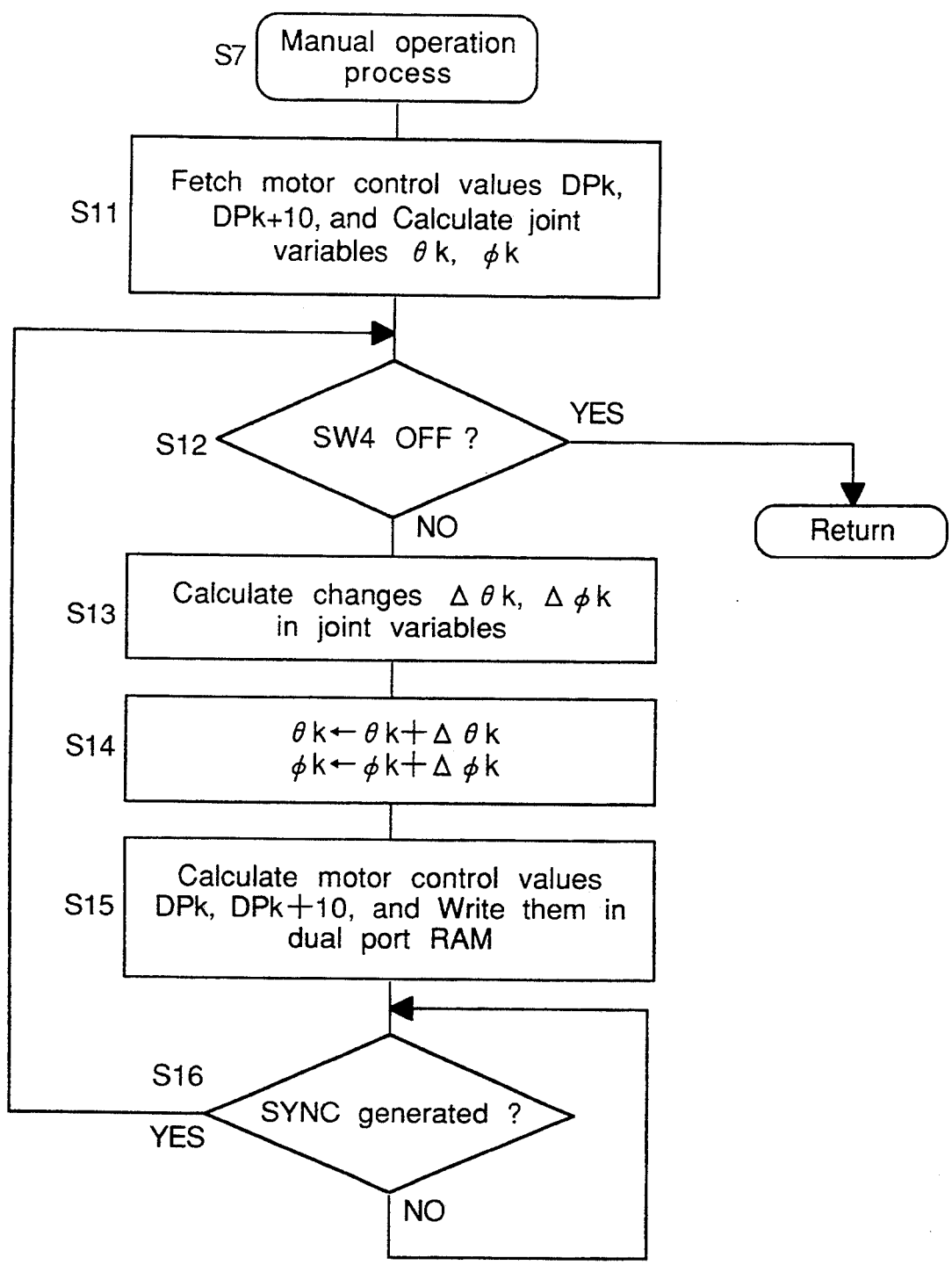
FIG. 17 is a flow chart showing a manual operation process of a subroutine shown in FIG. 16.
Figure 23:
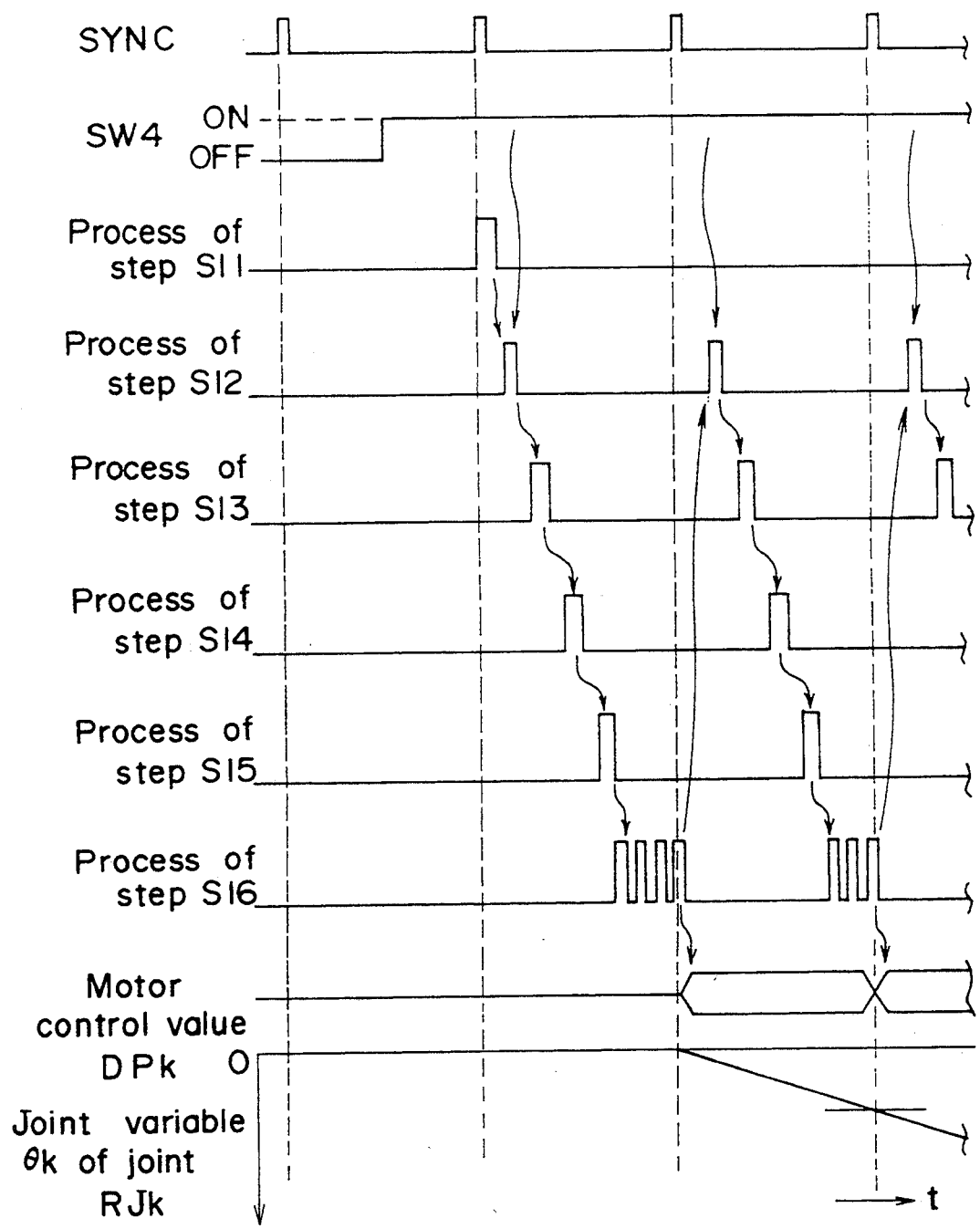
FIGS. 23 and 24 are timing charts showing an operation of the control unit shown in FIG. 2 which is executed in the manual operation process shown in FIG. 17.

(a) After switching the switch SW1 to the side A, the apparatus specifying switch SW3 of the teaching box 20 is switched over to the side of either the apparatus 10 or 11 to be controlled, and at least one of the rotation instructing switches SW4 corresponding to the joint to be controlled is turned on. Thereafter, the manual operation process shown in FIG. 17 is executed. Namely, as shown in FIG. 23, the above-specified joint is rotated by a predetermined angle in synchronous with the synchronizing signal SYNC until the switch SW4 is turned off after being turned on.

(b) When the tool reference point OTT of the tool 2 has reached the desirable teaching point, the switch SW4 having been turned on is turned off. Thereafter, in order to calculate the teaching data at this teaching point, the storage switch SW5 is turned on, thereby executing the teaching data calculation process.

(c) When the teaching data at a plurality of teaching points have been calculated by repeating the above processes (a) and (b), the end switch SW6 is turned on, thereby executing the task program generation process, and then, one teaching operation is completed.

Figure 19:
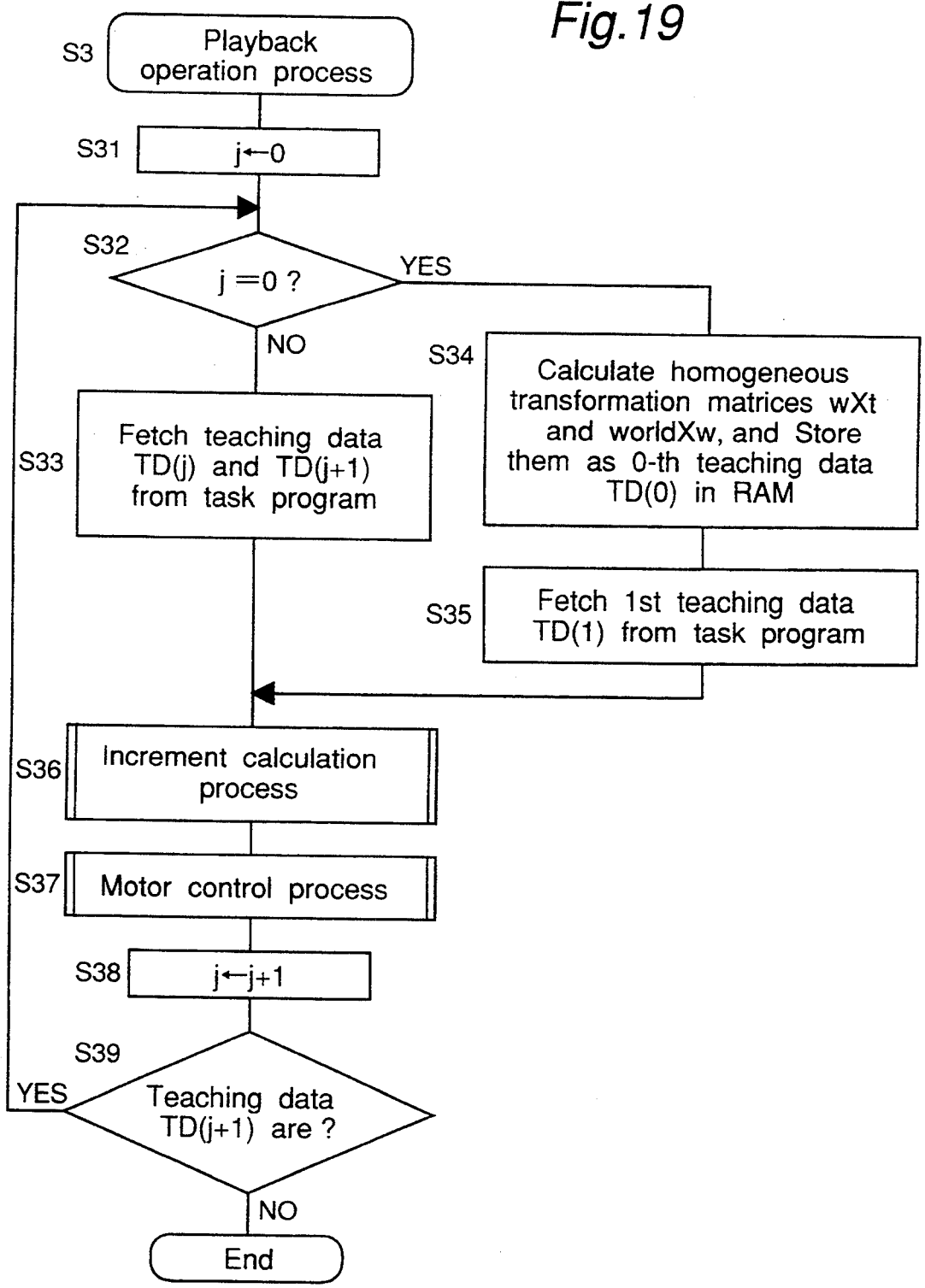
FIG. 19 is a flow chart showing a playback operation process of a subroutine shown in FIG. 16.

Thereafter, when the operator wishes to perform the automatic operation or the playback operation according to the task program generated in the teaching operation, the process switch SW1 is switched over to the side B, and then, the start switch SW2 is turned on, thereby executing the playback operation process (step S3) shown in FIG. 19.

(4-2) Manual Operation Process

Figure 24:
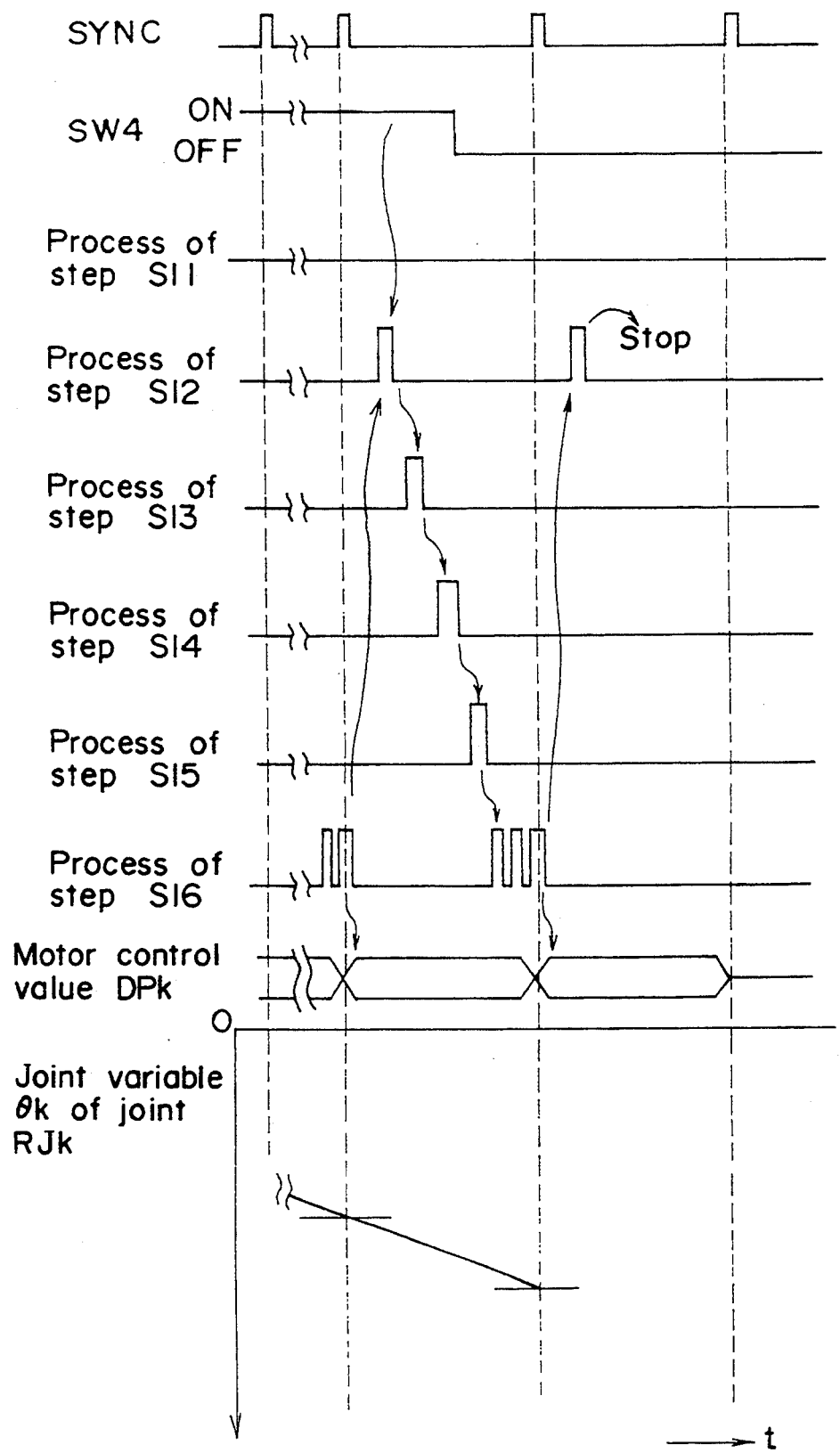

FIG. 17 shows the manual operation process shown in FIG. 16, and FIGS. 23 and 24 are timing charts showing one example of the manual operation process. In these timing charts shown in FIGS. 23 and 24, shown pulses of respective processes represent timings for executing the corresponding processes, respectively.

Referring to FIG. 17, first of all, data of the motor control values DPk and DPk+10 (k=1, 2, ..., 6) for respective joints stored in the dual port RAM 104 are fetched into the CPU 100 at step S11, and then, the joint variables $\theta k$ and $\theta k$ corresponding to the fetched data are calculated. Then, it is judged at step S12 whether or not the rotation instructing switch SW4 having been turned on is turned off. If the rotation instructing switch SW4 is turned off (YES at step S12), the program flow goes back to the original main routine. On the other hand, if the rotation instructing switch SW4 is not turned off (NO at step S12), changes $\Delta\theta k$ and $\Delta\phi k$ (k=1, 2, ..., 6) in the joint variables are calculated from a rotation direction and a joint corresponding to the switch turned on among the twelve rotation instructing switches SW4. It is to be noted that, in the process of step S13, the changes $\Delta\theta k$ and $\Delta\phi k$ in the joint variables of the joints corresponding to the switches other than the turned-on switch among the 12 rotation instructing switches SW4 are set to zero.

Thereafter, at step S14, the calculated changes $\Delta\theta k$ and $\Delta\theta k$ are added to the original joint variables $\theta k$ and $\phi k$, and then, the addition results are set as new joint variables $\theta k$ and $\phi k$. Further, at step S15, there are calculated the motor control values DPk and DPk+10 corresponding to the joint variables $\theta k$ and $\phi k$ calculated at step S14, and then, data of the calculated motor control values DPk and DPk+10 are written into the dual port RAM 104. Thereafter, it is judged at step S16 whether or not the synchronizing signal SYNC is generated. If the synchronizing signal SYNC is not generated (NO at step S16), the process of step S16 is repeated until the synchronizing signal SYNC is generated. If the synchronizing signal SYNC is generated (YES at step S16), the program flow goes back to step S12. Then, data of the motor control values DPk and DPk+10 set in the dual port RAM 104 are simultaneously latched by the latch circuit 105, and then, the latched data are outputted through the servo controllers 106 and 107 to the motors MO1 to MO6 and MO11 to MO16 of respective joints, thereby simultaneously driving the motors MO1 to MO6 and MO11 to MO16.

(4-3) Teaching Data Calculation Process

Figure 18:
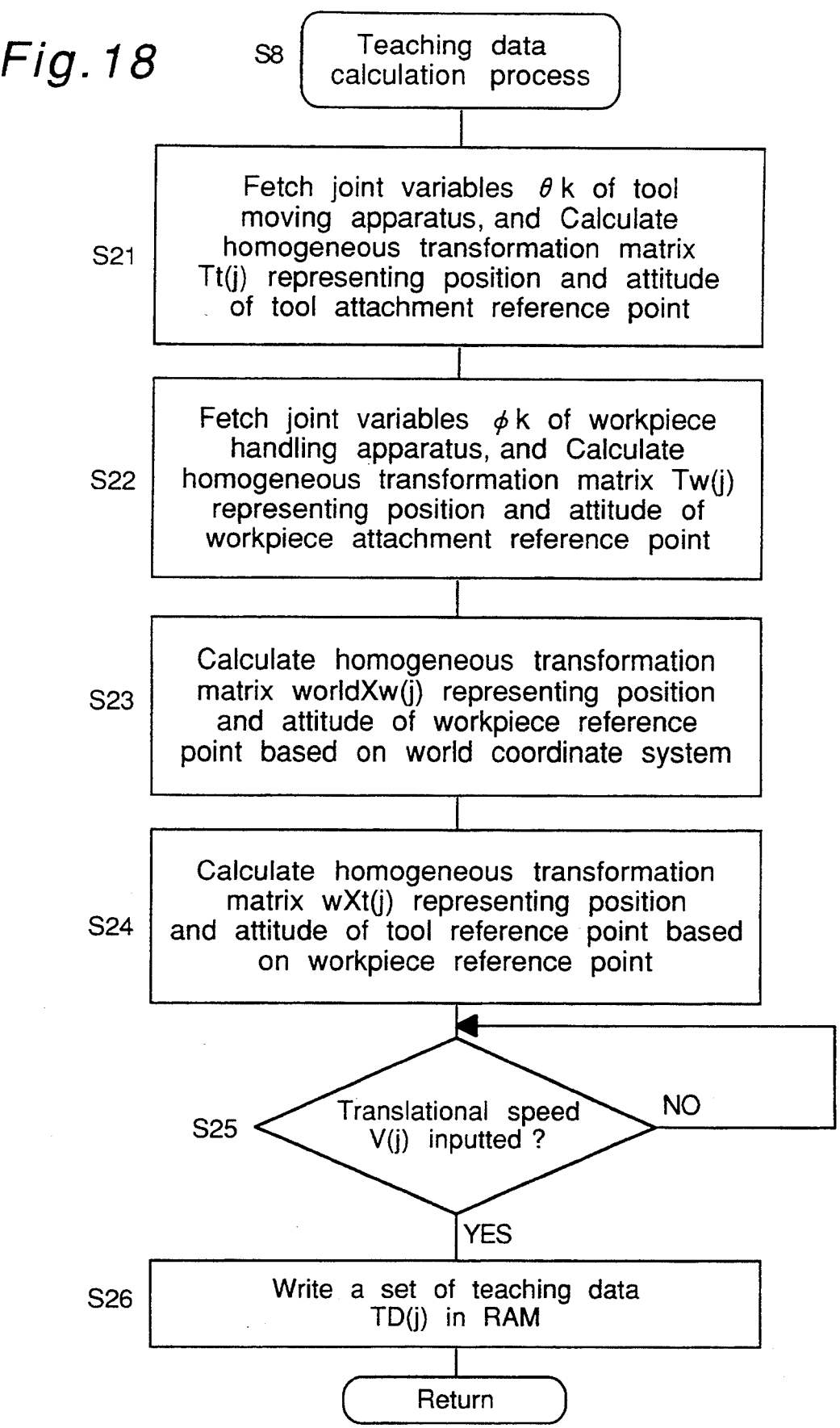
FIG. 18 is a flow chart showing a teaching data calculation process of a subroutine shown in FIG. 16.

FIG. 18 shows the teaching data calculation process shown in FIG. 16.

Referring to FIG. 18, first of all, at step S21, the homogeneous transformation matrix Tt(j) representing the position and attitude of the tool attachment reference point OT6 based on the baseplane (the Xbase-Ybase plane) of the tool moving apparatus 11 are calculated using the equation (1) and (4) from the joint variables $\theta k$ of the tool moving apparatus 11, and then, at step S22, the homogeneous transformation matrix Tw(j) representing the position and attitude of the workpiece attachment reference point OW6 based on the baseplane (the Xwbase-Ywbase plane) of the workpiece handling apparatus 12 are calculated using the equation (3) and (5) from the joint variables $\phi k$ of the workpiece handling apparatus 12. Thereafter, at step S23, the homogeneous transformation matrix worldXw(j) representing the position and attitude of the workpiece reference point OW based on the world coordinate system $\Sigma$world is calculated using the equation (6), and at step S24, the homogeneous transformation matrix worldXt(j) representing the position and attitude of the tool reference point OTT based on the world coordinate system $\Sigma$world is calculated using the equation (7). Further, it is judged at step S25 whether or not data of the translational speed V(j) of the tool reference point OTT are inputted using a set of ten keys SW7. If the data of the translational speed V(j) are not inputted (NO at step S25), the process of step S25 is repeated until the data thereof are inputted. On the other hand, if the data of the translational speed V(j) are inputted using a set of ten keys SW7 (YES at step S25), the program flow goes to step S26, and then, data of the homogeneous transformation matrices worldXw(j) and wXt(j) respectively calculated using the equations (6) and (9) and the inputted translational speed V(j) are stored as a set of the j-th teaching data TD(j) in the RAM 102. Then, the teaching data calculation process is completed, and then, the program flow goes back to the original main routine.

(4-4) Playback Operation Process

Figure 25:
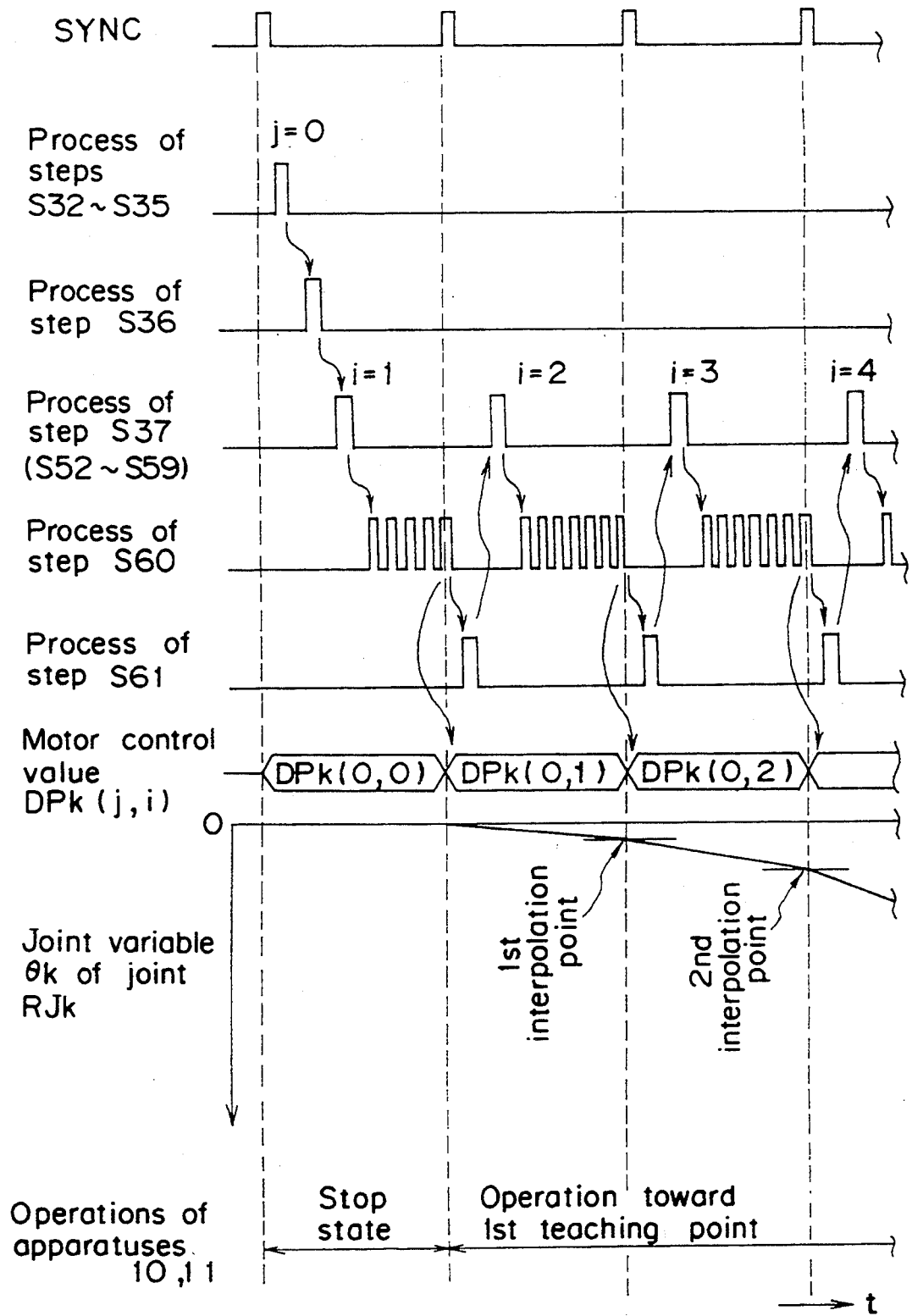
FIGS. 25 to 27 are timing charts showing an operation of the control unit shown in FIG. 2 which is executed in the playback operation process shown in FIG. 19.
Figure 26:
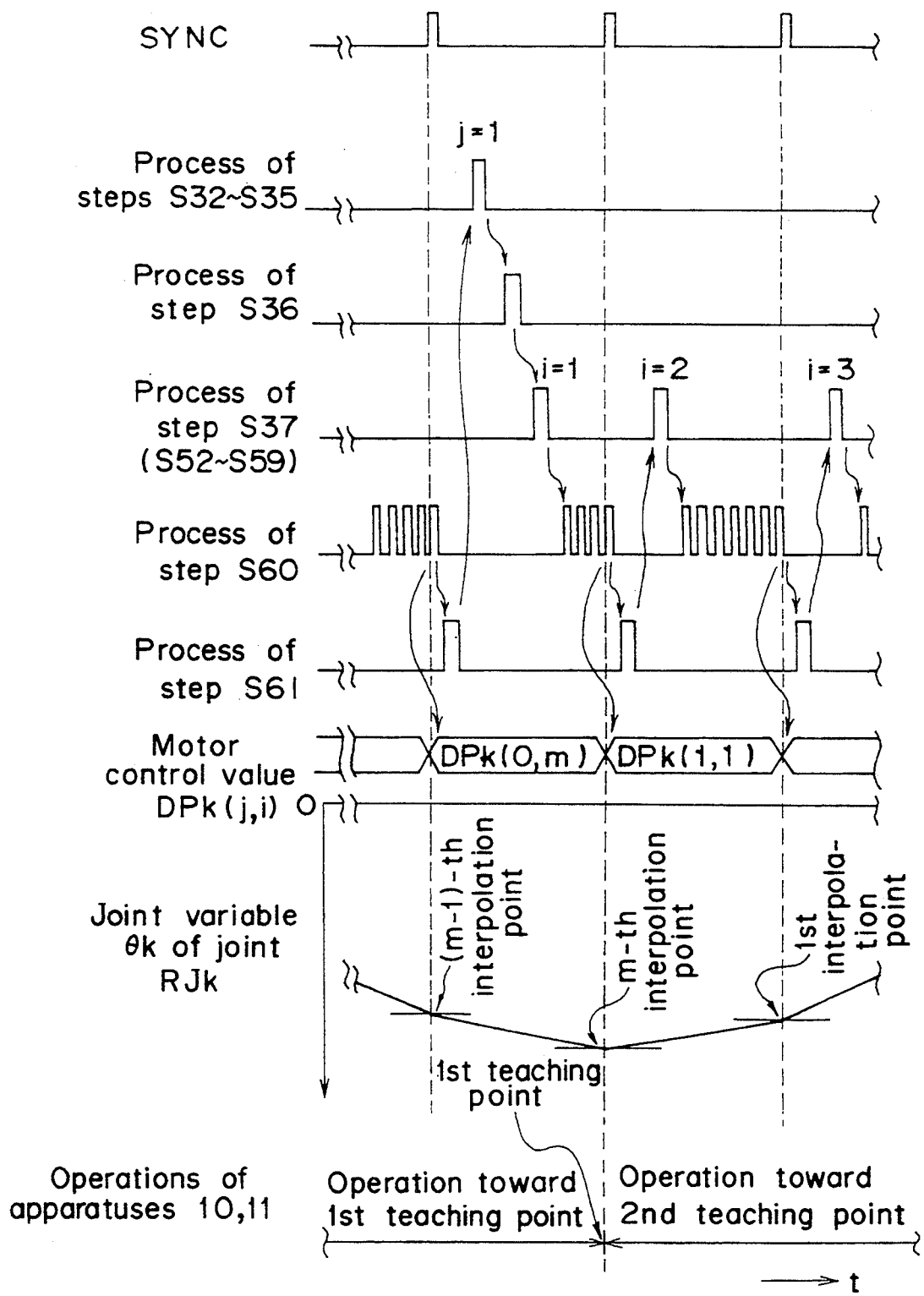
Figure 27:
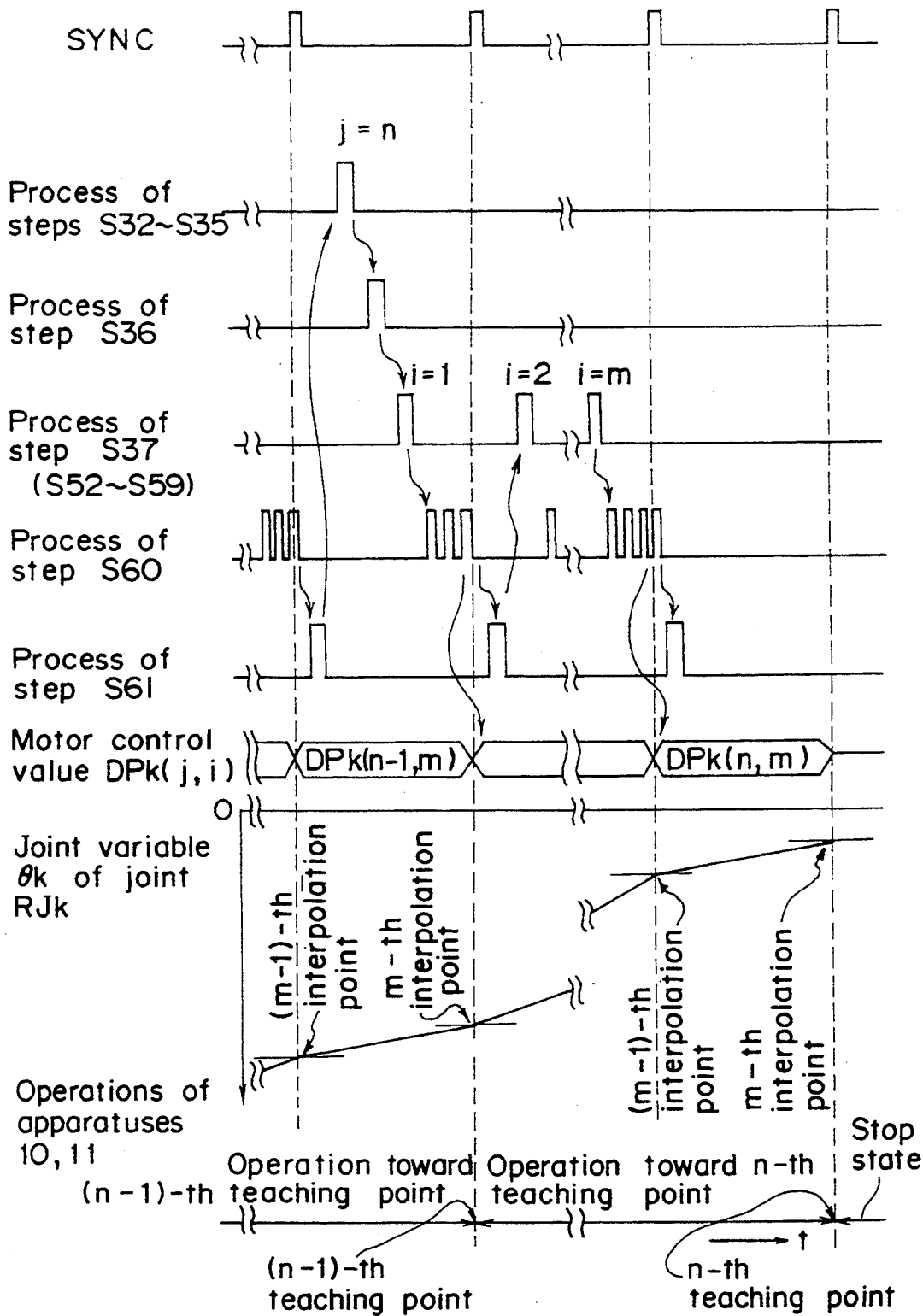
Figure 28A:
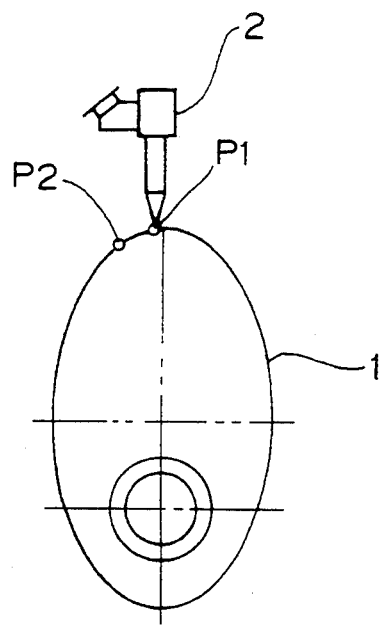
FIGS. 28a and 28b are front views showing one example of moving a tool of a welding torch changing an attitude of a workpiece in a conventional industrial robot system.
Figure 28B:
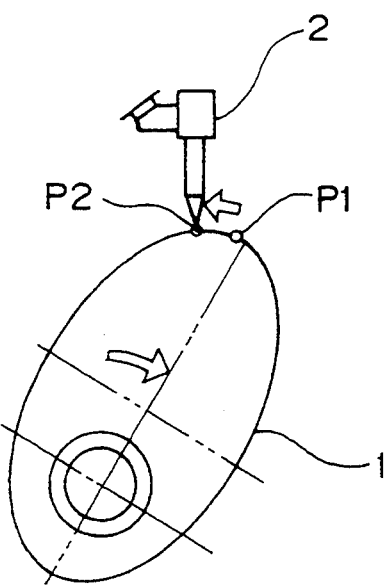

FIG. 19 shows the playback operation process shown in FIG. 16, and FIGS. 25 to 27 are timing charts showing one example of the playback operation process. In these timing charts shown in FIGS. 25 to 27, shown pulses of respective processes represent timings for executing the corresponding processes.

Referring to FIG. 19, first of all, at step S31, parameter j is reset to zero, and then, it is judged at step S32 whether or not the parameter j is zero. If the parameter j is zero (YES at step S32), the program flow goes to step S34. On the other hand, if the parameter j is not zero (NO at step S32), the program flow goes to step S33.

At step S34, data of the position and attitude at a start timing of the playback operation process are stored as the 0-th teaching data TD(0) in the RAM 102. Namely, since data of the motor control values DPk and DPk+10 (k=1, 2, ..., 6) corresponding to respective joint variables $\theta 1$ to $\theta 6$ and $\phi 1$ to $\phi 6$ which have been currently set are stored in the dual port RAM 104, respective joint variables $\theta 1$ to $\theta 6$ and $\phi 1$ to $\phi 6$ of the tool moving apparatus 11 and the workpiece handling apparatus 12 are inversely calculated from the data of the motor control values DPk and DPk+10 at the starting timing of the playback operation process in a manner similar to that of the above-mentioned teaching data calculation process, and then, data of the joint variables $\theta 1$ to $\theta 6$ and $\phi 1$ to $\phi 6$ are substituted into the above equations (6) and (9) to calculate the homogeneous transformation matrices worldXw(0) and wXt(0). Data of these calculated homogeneous transformation matrices worldXw(0) and wXt(0) are stored as the 0-th teaching data TD(0) at the 0-th teaching point in the RAM 102.

Thereafter, at step S35, the first teaching data TD(1) are fetched into the CPU 100 from the task program stored in the RAM 102, and then, the program flow goes to step S36.

On the other hand, at step S33, the j-th teaching data TD(j) and the (j+1)-th teaching data TD(j+1) are fetched into the CPU 100 from the task program stored in the RAM 102, and then, the program flow goes to step S36.

Figure 20:
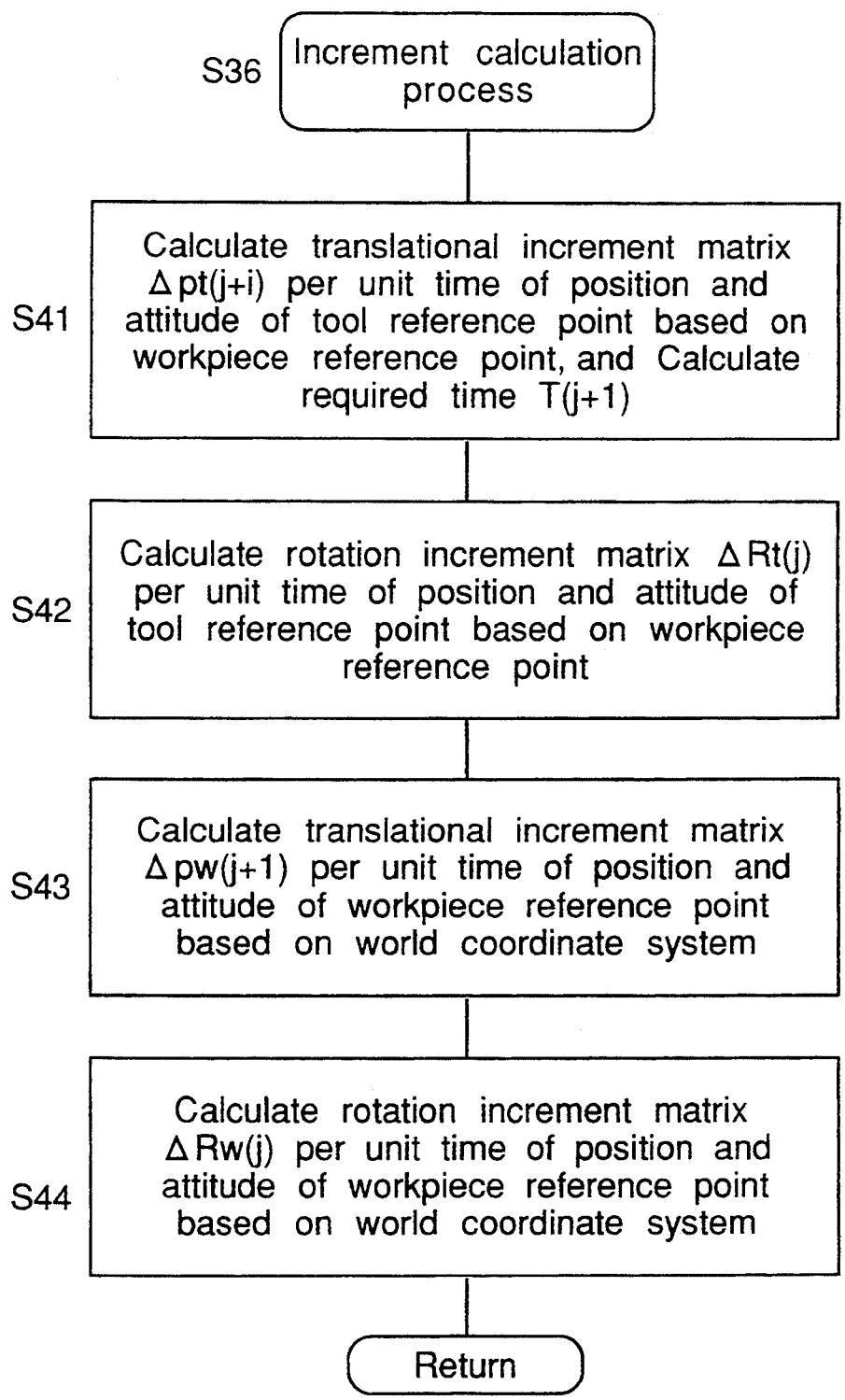
FIG. 20 is a flow chart showing an increment calculation process of a subroutine shown in FIG. 19.
Figure 21:
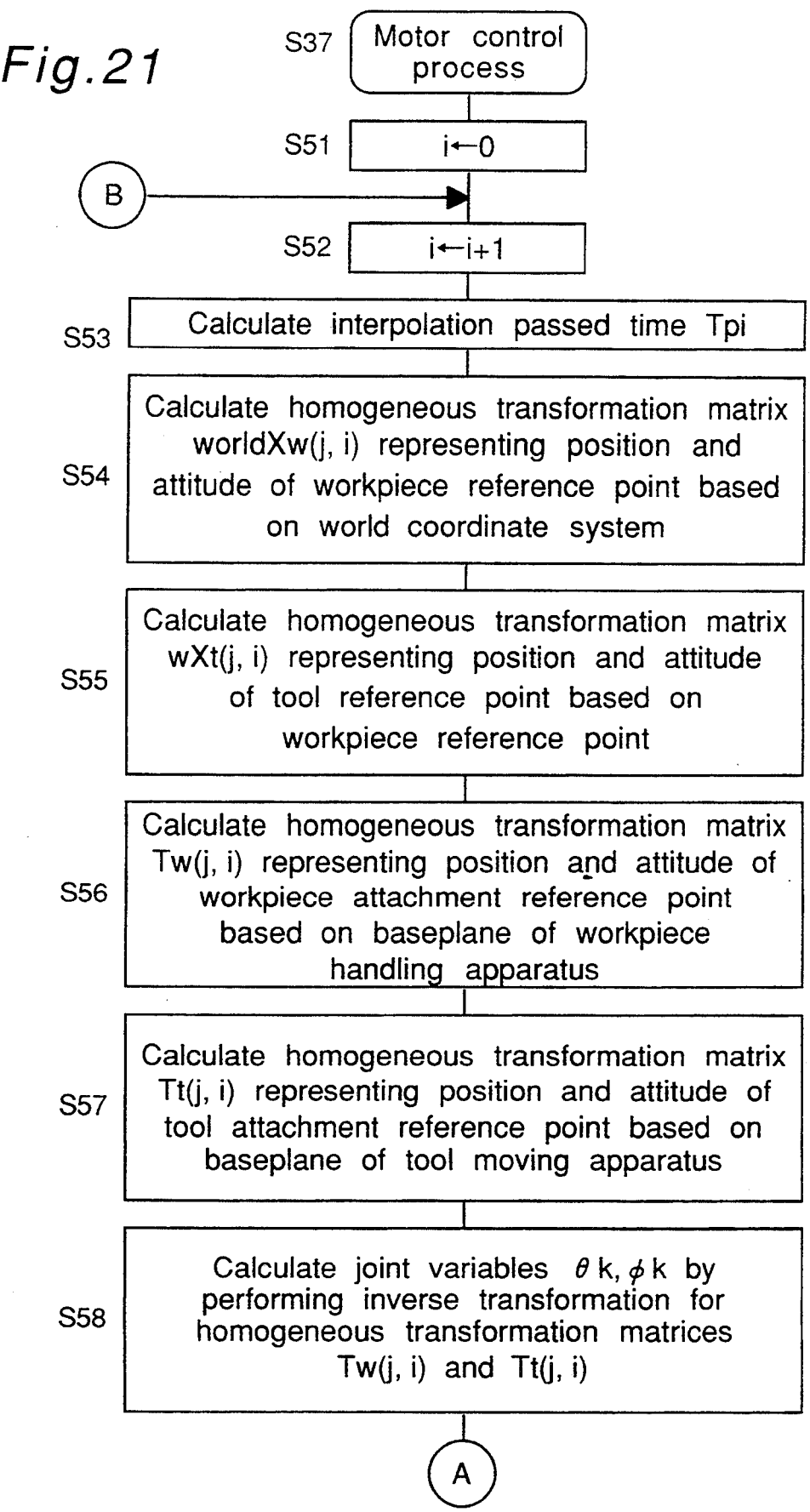
FIGS. 21 and 22 are flow charts showing a motor control process of a subroutine shown in FIG. 19.
Figure 22:
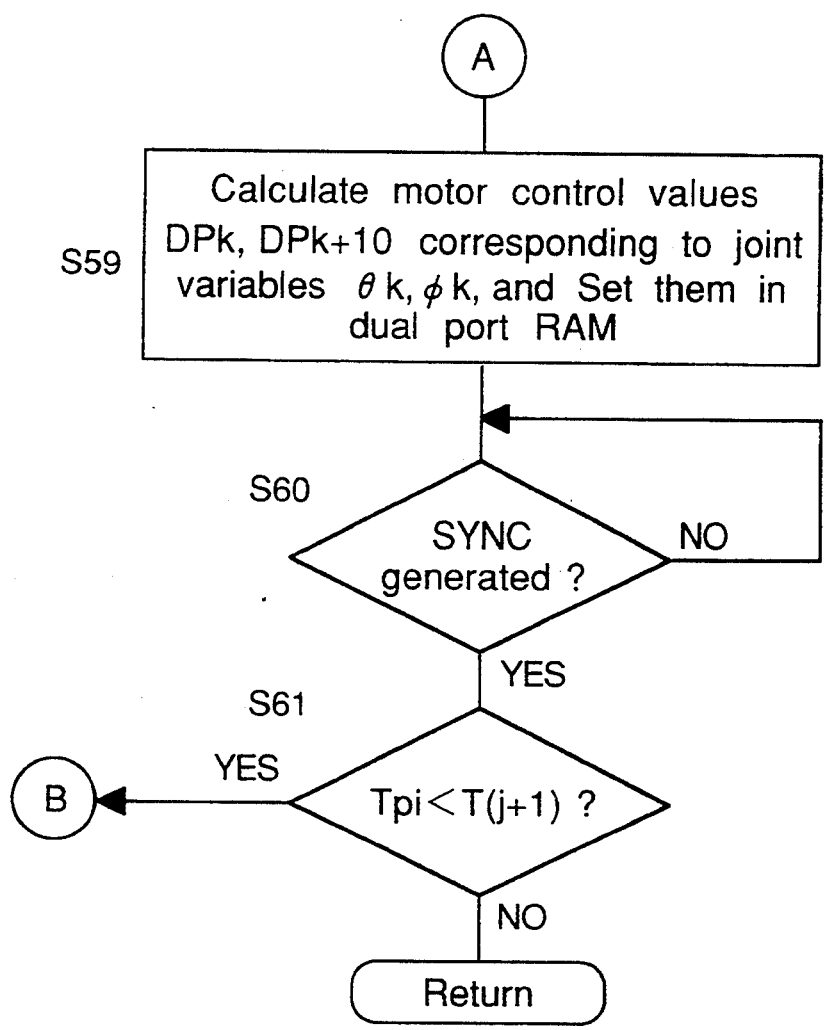

Thereafter, the increment calculation process shown in FIG. 20 is executed at step S36, and then, the motor control process shown in FIG. 21 is executed at step S37 to drive the motors MO1 to MO6 and MO11 to MO16 of respective joints. Further, the parameter j is incremented by one at step S38, and then, it is judged at step S39 whether or not the (j+1)-th teaching data are stored in the RAM 102. If the (j+1)-th teaching data are stored in the RAM 102 (YES at step S39), the program flow goes back to step S32 in order to execute the movement process toward the next teaching point. On the other hand, if the (j+1)th teaching data are not stored in the RAM 102 (NO at step S39), it is judged that the playback operation process is completed, and then, the program flow goes back to the original main routine.

(4-5) Increment Calculation Process

FIG. 20 shows the increment calculation process shown in FIG. 16.

Referring to FIG. 20, first of all, at step S41, the required time T(j+1) of the translational movement of the tool reference point OTT based on the workpiece reference point OW and the translational increment matrix $\Delta$pt(j+1) of the tool reference point OTT per the unit time based on the workpiece reference point OW when the tool reference point OTT of the tool 2 is moved from the j-th teaching point toward the (j+1)-th teaching point are calculated using the equations (13) and (14), respectively. Thereafter, at step S42, the rotational increment matrix $\Delta$Rt(j) of the tool reference point OTT per the unit time is calculated using the equation (21). Further, at step S43, there is calculated the translational increment matrix $\Delta$pw(j+1) of the workpiece reference point OW per the unit time based on the world coordinate system $\Sigma$world using the equation (24), and then, at step S44, there is calculated the rotational increment matrix $\Delta$Rw(j) of the workpiece reference point OW per the unit time based on the world coordinate system $\Sigma$world using the equation (25). Then, the increment calculation process is completed, namely, the process for planning the trajectory from the j-th teaching point toward the (j+1)-th teaching point is completed, and then, the program flow goes back to the original main routine.

(4-6) Motor Control Process

FIG. 21 shows the motor control process shown in FIG. 16.

Referring to FIG. 21, first of all, a parameter i representing the serial number of the interpolation point is reset to zero at step S51, the parameter i is incremented by one at step S52, and then, the interpolation passed time Tpi is calculated using the equation (27) at step S53. Thereafter, at the following steps S54 to S59, respective matrices, joint variables and motor control values at the i-th interpolation point when the interpolation passed time Tpi has been passed are calculated as follows.

At step S54, the homogeneous transformation matrix worldXw(j, i) representing the position and attitude of the workpiece reference point OW based on the world coordinate system Σworld is calculated using the equation (28), and then, the homogeneous transformation matrix wXt(j, i) representing the position and attitude of the tool reference point OTT based on the workpiece reference point OW is calculated using the equation (30) at step S55. Thereafter, after the homogeneous transformation matrix Tw(j, i) representing the position and attitude of the workpiece attachment reference point OW6 based on the baseplane of the workpiece handling apparatus 12 is calculated using the equation (33) at step S56, the homogeneous transformation matrix Tt(j, i) representing the position and attitude of the tool attachment reference point OT6 based on the baseplane of the tool moving apparatus 11 is calculated using the equation (37) at step S57. Further, respective joint variables $\theta_1$ to $\theta_6$ and $\phi_1$ to $\phi_6$ of the tool moving apparatus 11 and the workpiece handling apparatus 12 are calculated at step S58 by performing an inverse transformation for the above-calculated homogeneous transformation matrices Tw(j, i) and Tt(j, i), respectively, the motor control values DPk and DPk+10 corresponding to the above calculated joint variables $\theta_1$ to $\theta_6$ and $\phi_1$ to $\phi_6$ are calculated at step S59, and then, data of the calculated motor control values DPk and DPk+10 are stored in the dual port RAM 104.

Thereafter, it is judged at step S60 whether or not the synchronizing signal SYNC is generated. If the synchronizing signal SYNC is not generated (NO at step S60), the process of step S60 is repeated until the synchronizing signal SYNC is generated. On the other hand, if the synchronizing signal SYNC is generated (YES at step S60), the program flow goes to step S61. Then, the interpolation passed time Tpi has been passed, respective data stored in the dual port RAM 104 are simultaneously latched in synchronous with the synchronizing signal SYNC, and at the same time, these data are outputted through the servo controllers 106 and 107 to the motors MO1 to MO6 and MO11 to MO16, thereby simultaneously driving the motors MO1 to MO6 and MO11 to MO16.

Further, it is judged at step S61 whether or not the interpolation passed time Tpi is smaller than the required time T(j+1). If Tpi<T(j+1) (YES at step S61), the program flow goes back to step S52 in order to perform the processes of steps S52 to S60. On the other hand, if Tpi≧T(j+1) (NO at step S61), it is judged that the tool reference point OTT reaches the (j+1)-th teaching point, and then, the motor control process is completed, and the program flow goes back to the original main routine.

The calculation processes of respective motor control values DPk and DPk+10 executed at step S59 by the CPU 100 are performed at timings slightly shifted from each other, respectively. These data stored in the dual port RAM 104 after calculating them are simultaneously latched in synchronous with the synchronizing signal SYNC generated by the clock generator 110 and the frequency divider 111, and then, these data are outputted through the servo controllers 106 and 107 to the motors MO1 to MO6 and MO11 to MO16 so as to simultaneously drive them. Therefore, the motors MO1 to MO6 and MO11 to MO16 of respective joints can be driven at the same time, and the workpiece 1 and the tool 2 can be moved on the desirable trajectory between the adjacent or successive two teaching points in a predetermined constant relative speed with performing a coordinated operation for the tool moving apparatus 11 and the workpiece handling apparatus 12.

As described above, in the present preferred embodiment, since respective joints of the tool moving apparatus 11 and the workpiece handling apparatus 12 are controlled by only one control unit 3 in synchronous with the same synchronizing signal SYNC, the relative speed between the tool 2 and the workpiece 1 in the playback operation can be made constant. For example, in the case of applying the industrial robot system of the present preferred embodiment into a welding process, the tool moving apparatus 11 of one manipulator is made to hold a welding torch and also the workpiece handling apparatus 12 of one manipulator or positioner is made to hold a workpiece, and a predetermined coordinated operation is performed for them. In this case, even in the case of welding a work having a complicated shape, the position and attitude of the welding torch can be controlled in a predetermined constant relative speed changing the attitude of the workpiece, resulting in substantially real welding process. The industrial robot system comprising the control unit 3 can effectively apply into a process requiring a relative relationship between a workpiece and a tool, such as a coating process.

(5) Modifications

Figure 14:
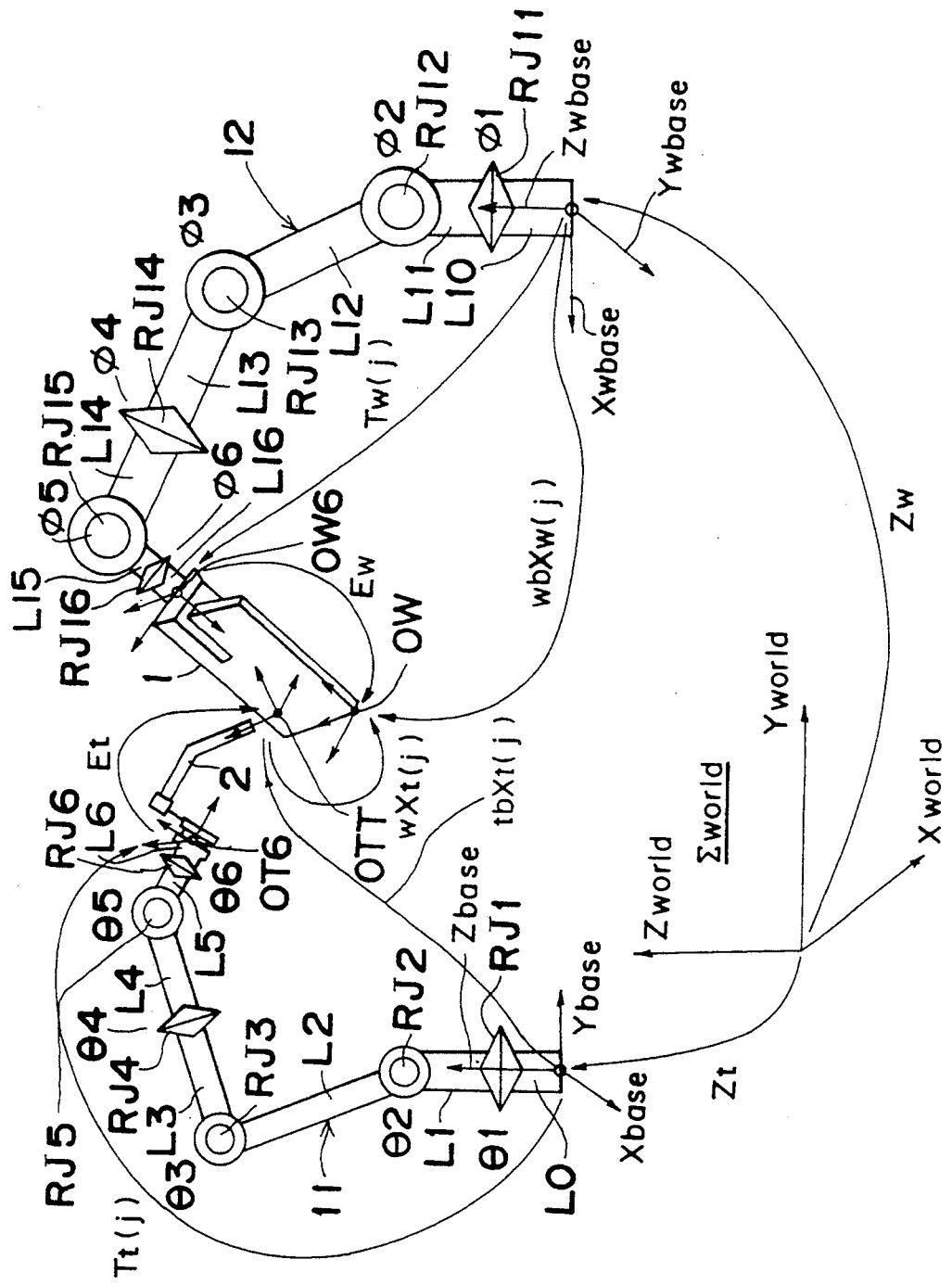
FIG. 14 is a schematic side view showing a relationship among respective coordinate systems set in a industrial robot system of a modification according to the present invention.

In the above-mentioned preferred embodiment, the homogeneous transformation matrix worldXw representing the position and attitude of the workpiece reference point 0W based on the world coordinate system Σworld is used as the teaching data for moving the workpiece 1, however, the present invention is not limited to this. The homogeneous transformation matrix worldXw may be replaced with a homogeneous transformation matrix wbXw representing a position and an attitude of the workpiece reference point OW based on the baseplane (the Xwbase-Ywbase plane) of the workpiece handling apparatus 12, as shown in FIG. 14. Equations used in this case will be described below.

In this case, a homogeneous transformation matrix wbXw(j) representing the workpiece reference point OW based on the baseplane (the Xwbase-Ywbase plane) of the workpiece handling apparatus 12 is represented corresponding to the equation (5) by the following equation (38):

$$wbXw(j) = Tw(j).Ew \qquad (38).$$

Then, a homogeneous transformation matrix worldXw(j) based on the world coordinate system Σworld is represented by the following equation (39):

$$worldXw(j) = Zw.wbXw(j) \qquad (39).$$

Further, substituting the right side of the equation (39) into the equation (9) gives a homogeneous transformation matrix wXt(j) of the following equation (40) representing the position and attitude of the tool reference point OTT based on the workpiece reference point OW:

$$wXt(j) = wbXw(j)^{-1}.Zw^{-1}.worldXt(j) \quad (40).$$

Further, substituting the right side of the equation (6) into the equation (40) gives the following equation (41):

$$wXt(j) = (wbXw(j))^{-1}. Zw^{-1}.Zt.Tt(j).Et \quad (41),$$

where a homogeneous transformation matrix tbXt(j) shown in FIG. 14 is represented by the following equation (42):

$$tbXt(j) = Tt(j).Et \quad (42).$$

The homogeneous transformation matrix worldXw used as the teaching data in the above-mentioned preferred embodiment is replaced with a homogeneous transformation matrix wbXw representing the position and attitude of the workpiece reference point OW based on the baseplane of the workpiece handling apparatus 12 in the modification. Namely, the left side of the equation (22) is replaced with a homogeneous transformation matrix wbXw(j), and the left side of the equation (23) is replaced with a homogeneous transformation matrix wbXw(j+1). Therefore, the homogeneous transformation matrix wbXw(j, i) corresponding to the equation (22) is represented by the following equation (43):

$$wbXw(j, i) = \quad (43)$$
$$wbXw(j) \cdot \Delta pw\ (Tpi) \cdot Rot(Krw\ (j), Tpi \cdot \phi w(j)/T(j + 1)).$$

Further, the homogeneous transformation matrix worldXw(j, i) of the equation (33) representing the position and attitude of the workpiece attachment reference point OW6 is replaced with a homogeneous transformation matrix Tw(j, i) of the following equation (44):

$$Tw(j,i) = wbXw(j,i).Ew^- \quad (44).$$

In the above-mentioned preferred embodiment, each of the tool moving apparatus 11 and the workpiece handling apparatus 12 is constituted by a manipulator with six degrees of freedom of motion, however, the present invention is not limited to this. The workpiece handling apparatus 12 may comprises a manipulator having at least one degree of freedom of motion, and the tool moving apparatus 11 may comprises a manipulator having at least six degrees of freedom of motion.

In the above-mentioned preferred embodiment, there is used the latch circuit 105, however, the present invention is not limited to this. The latch circuit 105 may be replaced with a processing unit such as a micro processing unit (MPU), a digital signal processor (DSP), a CPU or the like, which fetches data of the motor control values DPk and DPk+10 in a high speed from the dual port RAM 104, and outputs them to the servo controllers 106 and 107, in a high speed.

As is clear from the above description, the industrial robot system according to the present invention has the following advantageous effects.

(a) Since control data at a plurality of interpolation points are calculated and the joints of the tool handling apparatus 11 and the workpiece handling apparatus 12 are simultaneously driven in synchronous with the synchronizing signal SYNC, it is unnecessary to teach teaching data at a large number of teaching points, resulting in a number of teaching points smaller than those of the conventional apparatuses. The operator can easily and quickly enter teaching data in a teaching operation. As a result, the memory capacity of the storage unit for storing the task program composed of teaching data such as the RAM 102 can be made smaller than those of the conventional apparatuses, resulting in lowering the system cost.

(b) Since the tool 2 and the workpiece 1 can be moved in a predetermined constant relative speed on a desirable trajectory between the adjacent or successive teaching points, the translational movement speed of, for example, the tool reference point OTT based on the workpiece reference point OW can be reproduced faithfully in the playback operation according to the entered teaching data, and then, the coordinated operation between the tool moving apparatus 11 and the workpiece handling apparatus 12 can be more certainly performed with accuracy.

(c) Since the tool moving apparatus 11 and the workpiece handling apparatus 12 are controlled using only one control unit 3, it is unnecessary to communicate between two control units. Therefore, it is unnecessary to perform a high speed communication for exchanging information between the two control units.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

TABLE 1

| Link $L_n$ | Joint variable $\theta_n$ | Common normal distance $a_{nt}$ | Distance between links $d_{nt}$ | Twist angle $\alpha_{nt}$ |
|---|---|---|---|---|
| L0 | 0 | 0 | $d_{0t}$ | 0 |
| L1 | $\theta_1$ | $a_{1t}$ | $d_{1t}$ | $+\pi/2$ |
| L2 | $\theta_2$ | $a_{2t}$ | 0 | 0 |
| L3 | $\theta_3$ | $a_{3t}$ | 0 | $+\pi/2$ |
| L4 | $\theta_4$ | 0 | $d_{4t}$ | $+\pi/2$ |
| L5 | $\theta_5$ | 0 | 0 | $-\pi/2$ |
| L6 | $\theta_6$ | 0 | $d_{6t}$ | 0 |

What is claimed is:

1. An apparatus for controlling an industrial robot system comprising a workpiece handling apparatus having first revolute joint means for moving a workpiece, and a tool moving apparatus having second revolute joint means for moving a tool, so as to coordinately move said tool on a first trajectory located between adjacent first and second points and said workpiece on a second trajectory located between adjacent third and fourth points, said first, second, third, and fourth points being predetermined as teaching points, the apparatus comprising:

(a) first memory means for storing at least four sets of teaching data at said first, second, third, and fourth points, each set of teaching data including
   (1) a tool position defined as a position and an attitude of said tool based on a workpiece reference point predetermined in said workpiece, (2) a workpiece position defined as a position and an attitude of said workpiece based on a predetermined reference coordinate system, and (3) a tool speed defined as a translational speed of a tool reference point predetermined in said tool based on said workpiece reference point upon a translational movement of said tool on said first trajectory;

(b) first interpolation means, operatively connected with said first memory means, in response to said tool positions and said tool speeds at said first and second points which are stored in said first memory means, for calculating a time required for said translational movement of said tool position from said first point to said second point, and a plurality of pairs of positions and attitudes of said tool based on said workpiece reference point, at a plurality of first interpolation points obtained by dividing said first trajectory by a predetermined number of interpolation intervals, using a predetermined interpolation method;

(c) second interpolation means, operatively connected with said first memory means and said first interpolation means, in response to said workpiece positions at said third and fourth points which are stored in said first memory means and said required time calculated by said first interpolation means, for calculating a plurality of pairs of positions and attitude of said workpiece based on said predetermined reference coordinate system, at a plurality of second interpolation points obtained by dividing said second trajectory by said predetermined number of interpolation intervals, using another predetermined interpolation method;

(d) first calculation means, operatively connected with said second interpolation means, in response to said plurality of pairs of positions and attitudes of said workpiece based on said reference coordinate system at said plurality of second interpolation points which are calculated by said second interpolation means, for calculating a position and an attitude of a predetermined coordinate system of a predetermined workpiece attachment reference point based on a coordinate system of a baseplane of said workpiece handling apparatus, said calculated position and attitude of said coordinate system corresponding to each of said second interpolation points;

(e) second calculation means, operatively connected with said first and second interpolation means, in response to said plurality of positions and attitudes of said workpiece based on said reference coordinate system at said plurality of second interpolation points which are calculated by said second interpolation means, and said plurality of positions and attitudes of said tool based on said workpiece reference point which are calculated by said first interpolation means, for calculating a position and an attitude of a predetermined coordinate system of a predetermined tool attachment reference point based on a coordinate system of a baseplane of said tool moving apparatus, said calculated position and attitude of a predetermined coordinate system corresponding to each of said first interpolation points;

(f) third calculation means, operatively connected with by said first calculation means, in response to the position and attitude of said coordinate system of said workpiece attachment reference point which are calculated by said first calculation means, for calculating joint variables of said first revolute joint means for moving said workpiece on said second trajectory;

(g) fourth calculation means, operatively connected with said second calculation means, in response to the position and attitude of said coordinate system of said tool attachment reference point which are calculated by said second calculation means, for calculating joint variables of said second revolute joint means for moving said tool on said first trajectory; and (h) driving means, operatively connected with said first and second revolute joint means and said third and fourth calculation means, in response to said joint variables of said first revolute joint means calculated by said third calculation means and said joint variables of said second revolute joint means calculated by said fourth calculation means, for simultaneously driving said first revolute joint means of said workpiece handling apparatus and said second revolute joint means of said tool moving apparatus, to coordinately move said tool on said first trajectory and said workpiece on said second trajectory.

2. The apparatus as claimed in claim 1, wherein said driving means comprises:

(a) signal generation means for generating a synchronizing signal having a predetermined period;

(b) synchronously outputting means for simultaneously storing and outputting said joint variables of said first and second revolute joint means respectively calculated by said third and fourth calculation means in synchronous with said synchronizing signal generated by said signal generation means; and (c) driving control means for simultaneously driving said first and second revolute joint means in accordance to said joint variables of said first and second revolute joint means outputted from said synchronously outputting means.

3. The apparatus as claimed in claim 2,
wherein said synchronously outputting means is a latch circuit.

4. The apparatus as claimed in claim 2,
wherein said synchronously outputting means is a processing unit.

5. The apparatus as claimed in claim 2,
wherein said reference coordinate system is a predetermined world coordinate system.

6. The apparatus as claimed in claim 2,
wherein said reference coordinate system is a predetermined coordinate system of a baseplane of said workpiece.

7. The apparatus as claimed in claim 1,
wherein said reference coordinate system is a predetermined world coordinate system.

8. The apparatus as claimed in claim 1,
wherein said reference coordinate system is a predetermined coordinate system of a baseplane of said workpiece.

9. A method of controlling an industrial robot system comprising (i) a workpiece handling apparatus having first revolute joint means for moving a workpiece, and (ii) a tool moving apparatus having second revolute joint means for moving a tool, so as to coordinately move said tool on a first trajectory located between adjacent first and second points and said workpiece on a second trajectory located between adjacent third and fourth points, said first, second, third, and fourth points being predetermined as teaching points, said method including the steps of:

(a) storing at least four sets of teaching data at said first, second, third, and fourth points, each set of teaching data including
  (1) a tool position defined as a position and an attitude of said tool based on a workpiece reference point predetermined in said workpiece,
  (3) a workpiece position defined as a position and an attitude of said workpiece based on a predetermined reference coordinate system, and
  (3) a tool speed defined as a translational speed of a tool reference point predetermined in said tool based on said workpiece reference point upon a translational movement of said tool on said first trajectory;

(b) in response to said tool positions and said tool speeds at said first and second points which are stored in said storing step (a), calculating a time required for said translational movement of said tool position from said first point to said second point, and a plurality of pairs of positions and attitudes of said tool based on said workpiece reference point, at a plurality of first interpolation points obtained by dividing said first trajectory by a predetermined number of interpolation intervals, using a predetermined interpolation method;

(c) in response to said workpiece positions at said third and fourth points which are stored in said storing step (a) and said required time calculated in said calculating step (b), calculating a plurality of pairs of positions and attitudes of said workpiece based on said predetermined reference coordinate system, at a plurality of second interpolation points obtained by dividing said second trajectory by said predetermined number of interpolation intervals, using another predetermined interpolation method;

(d) in response to said plurality of pairs of positions and attitudes of said workpiece based on said reference coordinate system at said plurality of second interpolation points which are calculated in said calculating step (c), calculating a position and an attitude of a predetermined coordinate system of a predetermined workpiece attachment reference point based on a coordinate system of a baseplane of said workpiece handling apparatus, said calculated position and attitude of said coordinate system corresponding to each of said second interpolation points;

(e) in response to said plurality of positions and attitude of said workpiece based on said reference coordinate system at said plurality of second interpolation points which are calculated in said calculating step (c) and said plurality of positions and attitudes of said tool based on said workpiece reference point which are calculated in said calculating step (b), calculating a position and an attitude of a predetermined coordinate system of a predetermined tool attachment reference point based on a coordinate system of a baseplane of said tool moving apparatus, said calculated position and attitude of a predetermined coordinate system corresponding to each of said first interpolation points;

(f) in response to the position and attitude of said coordinate system of said workpiece attachment reference point which are calculated in said calculating step (b), calculating joint variables of said first revolute joint means for moving said workpiece on said second trajectory;

(g) in response to the position and attitude of said coordinate system of said tool attachment reference point which are calculated in said calculating step (c), calculating joint variables of said second revolute joint means for moving said tool on said first trajectory; and (h) in response to said joint variables of said first revolute joint means calculated in said calculating step (f) and said joint variables of said second revolute joint means calculating in said calculating step (g), simultaneously driving said first revolute joint means of said workpiece handling apparatus and said second revolute joint means of said tool moving apparatus, to coordinately move said tool on said first trajectory and said workpiece on said second trajectory.

10. The method as claimed in claim 9, wherein said driving step (h) includes:

(i) generating a synchronizing signal having a predetermined period;

(j) simultaneously storing and outputting said joint variables of said first and second revolute joint means respectively calculated at said calculated steps (f) and (g) in synchronous with said generated synchronizing signal; and (h) simultaneously driving said first and second revolute joint means in accordance to said outputted joint variables of said first and second revolute joint means.

11. The method as claimed in claim 10, wherein said reference coordinate system is a predetermined world coordinate system.

12. The method as claimed in claim 10, wherein said reference coordinate system is a predetermined coordinate system of a baseplane of said workpiece.

13. The method as claimed in claim 9, wherein said reference coordinate system is a predetermined world coordinate system.

14. The method as claimed in claim 9, wherein said reference coordinate system is a predetermined coordinate system of a baseplane of said workpiece.

* * * * *

UNITED STATES PATENT AND TRADEMARK OFFICE
CERTIFICATE OF CORRECTION

PATENT NO. : 5,353,386  
DATED : October 4, 1994  
INVENTOR(S) : Fumio Kasagami, et al.

Page 1 of 4

It is certified that error appears in the above-indentified patent and that said Letters Patent is hereby corrected as shown below:

On the Title Page, Section [56], under "U.S. PATENT "DOCUMENTS" after "Birk et al. ..." insert the following:  
--4,828,345  5/89  Martin et al    414/738--

In the Abstract, line 17: "tile" should read --the--  
    Column 6, line 4: "(2)" should read --(4)--  
    Column 7, line 26: "d1t" should read --d0t--  
    Column 9, line 34: "enw" should read --αnw--  
    Column 9, line 44: "(ABr)w(j)" should read --Anw(j)--  
    Column 13, line 6: "worldXw.(j)" should read --worldXw(j)--  
    Column 14, line 14: "δt(j" should read --δpt(j--  
    Column 14, line 15: "art" should read --an--  
    Column 14, line 19: ".by" should read --by--  
    Column 14, line 53: "tile" should read --the--  
    Column 15, line 56: "Apw" should read --Δpw--

UNITED STATES PATENT AND TRADEMARK OFFICE
CERTIFICATE OF CORRECTION

PATENT NO. : 5,353,386
DATED : October 4, 1994
INVENTOR(S) : Fumio Kasagami, et al.

It is certified that error appears in the above-indentified patent and that said Letters Patent is hereby corrected as shown below:

Column 16, line 67: "At" should read -- $\Delta t$ --

Column 18, line 3: "Zw.Tw(j,i).Ew$^{-1}$" should read -- $Zw^{-1} \cdot worldXw(j, i) \cdot Ew^{-1}$ --

Column 18, line 60: "tile" should read --the--

Column 19, line 10: after "preferred" insert --embodiment--

Column 20, line 34: " $\theta k$ " should read -- $\phi k$ --

Column 20, line 51: " $\Delta \theta k$ " should read -- $\Delta \phi k$ --

Column 22, line 31: "(j + 1)th" should read --(j + 1)-th--

Column 25, line 40: "eW$^-$" should read --Ew$^{-1}$--

Column 28, line 48, Claim 5: "claim 2" should read --claim 1--

Column 28, line 51, Claim 6: "claim 2" should read --claim 1--

UNITED STATES PATENT AND TRADEMARK OFFICE
CERTIFICATE OF CORRECTION

PATENT NO. : 5,353,386
DATED : October 4, 1994
INVENTOR(S) : Fumio Kasagami, et al.

It is certified that error appears in the above-indentified patent and that said Letters Patent is hereby corrected as shown below:

Column 28, line 55, Claim 7: "claim 1" should read --claim 2--

Column 28, line 58, Claim 8: "claim 1" should read --claim 2--

Column 29, line 11, Claim 9: "(3)" should read --(2)--

Column 30, line 44, Claim 11: "claim 10" should read --claim 9--

Column 30, line 47, Claim 12: "claim 10" should read --claim 9--

Column 30, line 51, Claim 13: "claim 9" should read --claim 10--

UNITED STATES PATENT AND TRADEMARK OFFICE
CERTIFICATE OF CORRECTION

PATENT NO. : 5,353,386
DATED : October 4, 1994
INVENTOR(S) : Fumio Kasagami, et al.

It is certified that error appears in the above-indentified patent and that said Letters Patent is hereby corrected as shown below:

Column 30, line 54, Claim 14: "claim 9" should read --claim 10--.

Signed and Sealed this

Nineteenth Day of March, 1996

Attest:

BRUCE LEHMAN

Attesting Officer   Commissioner of Patents and Trademarks